(12) United States Patent
Speicher et al.

(10) Patent No.: US 12,345,369 B2
(45) Date of Patent: Jul. 1, 2025

(54) SECURELY FIXABLE VEHICULAR DISPLAY MOUNTING SYSTEM

(71) Applicants: Ronald J. Speicher, Chattanooga, TN (US); David A. Craft, Chattanooga, TN (US)

(72) Inventors: Ronald J. Speicher, Chattanooga, TN (US); David A. Craft, Chattanooga, TN (US)

( * ) Notice: Subject to any disclaimer, the term of this patent is extended or adjusted under 35 U.S.C. 154(b) by 303 days.

(21) Appl. No.: 17/063,370

(22) Filed: Oct. 5, 2020

(65) Prior Publication Data

US 2021/0080047 A1    Mar. 18, 2021

Related U.S. Application Data

(63) Continuation of application No. 15/881,771, filed on Jan. 27, 2018, now abandoned.

(60) Provisional application No. 62/451,577, filed on Jan. 27, 2017.

(51) Int. Cl.

| | | |
|---|---|---|
| *F16M 11/12* | (2006.01) | |
| *B60K 35/00* | (2006.01) | |
| *B60K 35/50* | (2024.01) | |
| *B60R 11/02* | (2006.01) | |
| *F16M 11/10* | (2006.01) | |
| *F16M 11/14* | (2006.01) | |
| *F16M 11/20* | (2006.01) | |
| *F16M 11/24* | (2006.01) | |
| *F16M 13/02* | (2006.01) | |
| *F21V 21/14* | (2006.01) | |
| *B60K 35/22* | (2024.01) | |
| *B60K 35/53* | (2024.01) | |
| *B63B 49/00* | (2006.01) | |

(52) U.S. Cl.
CPC .......... *F16M 11/123* (2013.01); *B60K 35/00* (2013.01); *B60K 35/50* (2024.01); *B60R 11/0258* (2013.01); *F16M 11/10* (2013.01); *F16M 11/14* (2013.01); *F16M 11/24* (2013.01); *F16M 13/02* (2013.01); *F21V 21/14* (2013.01); *B60K 35/22* (2024.01); *B60K 35/53* (2024.01); *B60K 2360/816* (2024.01); *B60R 2300/205* (2013.01); *B63B 49/00* (2013.01); *F16M 2200/022* (2013.01)

(58) Field of Classification Search
CPC .......... F16M 11/123; F16M 2200/022; F16M 11/2021; F16M 11/10; F16M 11/12; F16M 11/121; F16M 11/2035; F16M 11/2042; F16M 11/205; B60R 11/0258; B60R 2300/205; B60R 2011/0288; F21V 21/14; B63F 49/00
See application file for complete search history.

(56) References Cited

U.S. PATENT DOCUMENTS 5,060,260 A * 10/1991 O'Connell .......... B60R 11/0241
                                                        379/426
5,109,411 A *  4/1992 O'Connell ......... F16M 11/2021
                                                        379/454

(Continued)

*Primary Examiner* — Christopher Garft
(74) *Attorney, Agent, or Firm* — Miller & Martin PLLC

(57) ABSTRACT

Novel multi-fastener fixable joint adjustments provide secure and watertight mounting to a vehicle while providing secure frictional adjustment relative to the mount base and sandwiching gimbal mount devices with braces of substantial design to provide additional stability.

20 Claims, 44 Drawing Sheets

(56) References Cited

U.S. PATENT DOCUMENTS

| | | | | |
|---|---|---|---|---|
| 6,019,332 | A * | 2/2000 | Sweere | A47B 21/00 |
| | | | | 248/292.12 |
| 6,367,756 | B1 * | 4/2002 | Wang | F16M 11/2014 |
| | | | | 248/278.1 |
| 6,688,572 | B2 * | 2/2004 | Huang | F16M 13/02 |
| | | | | 248/291.1 |
| 7,530,541 | B2 * | 5/2009 | Wang | F16M 11/10 |
| | | | | 248/921 |
| 9,346,414 | B1 * | 5/2016 | Kuhens | B60R 11/0258 |
| 2003/0122046 | A1 * | 7/2003 | Huong | F16M 11/10 |
| | | | | 248/922 |
| 2004/0211872 | A1 * | 10/2004 | Dittmer | F16M 11/10 |
| | | | | 348/E5.145 |
| 2011/0168855 | A1 * | 7/2011 | Bonczyk | H01Q 1/1242 |
| | | | | 248/201 |

\* cited by examiner

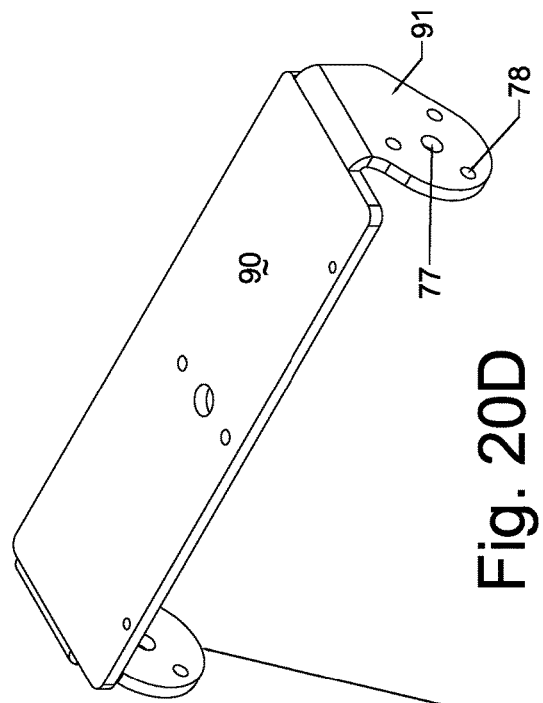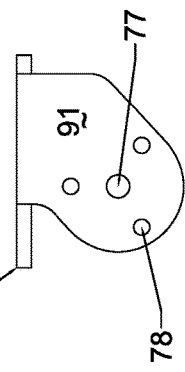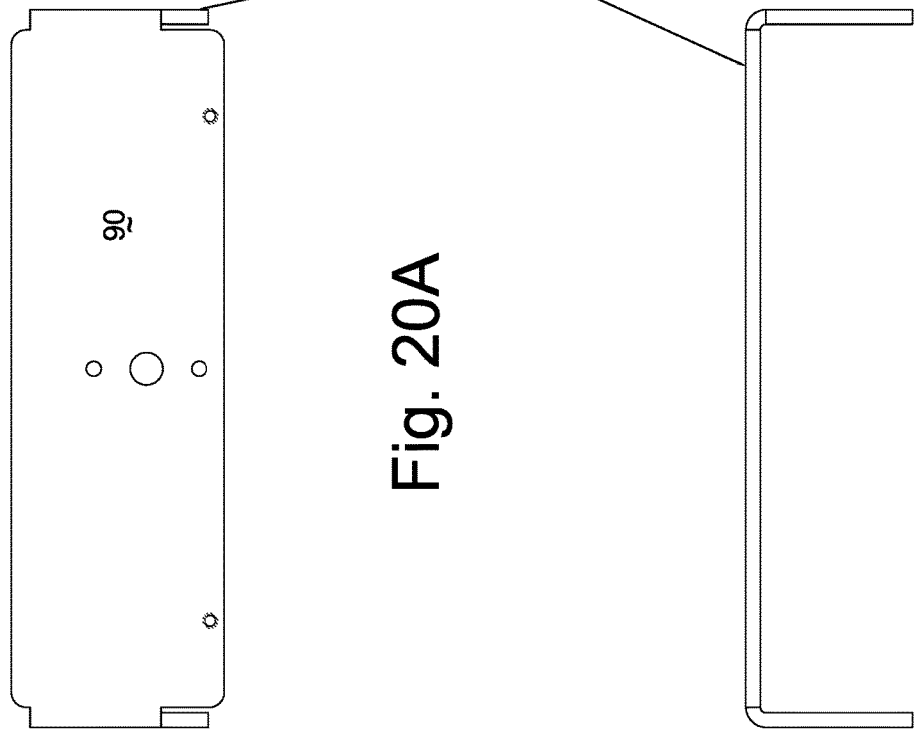
Fig. 20A
Fig. 20B
Fig. 20C
Fig. 20D

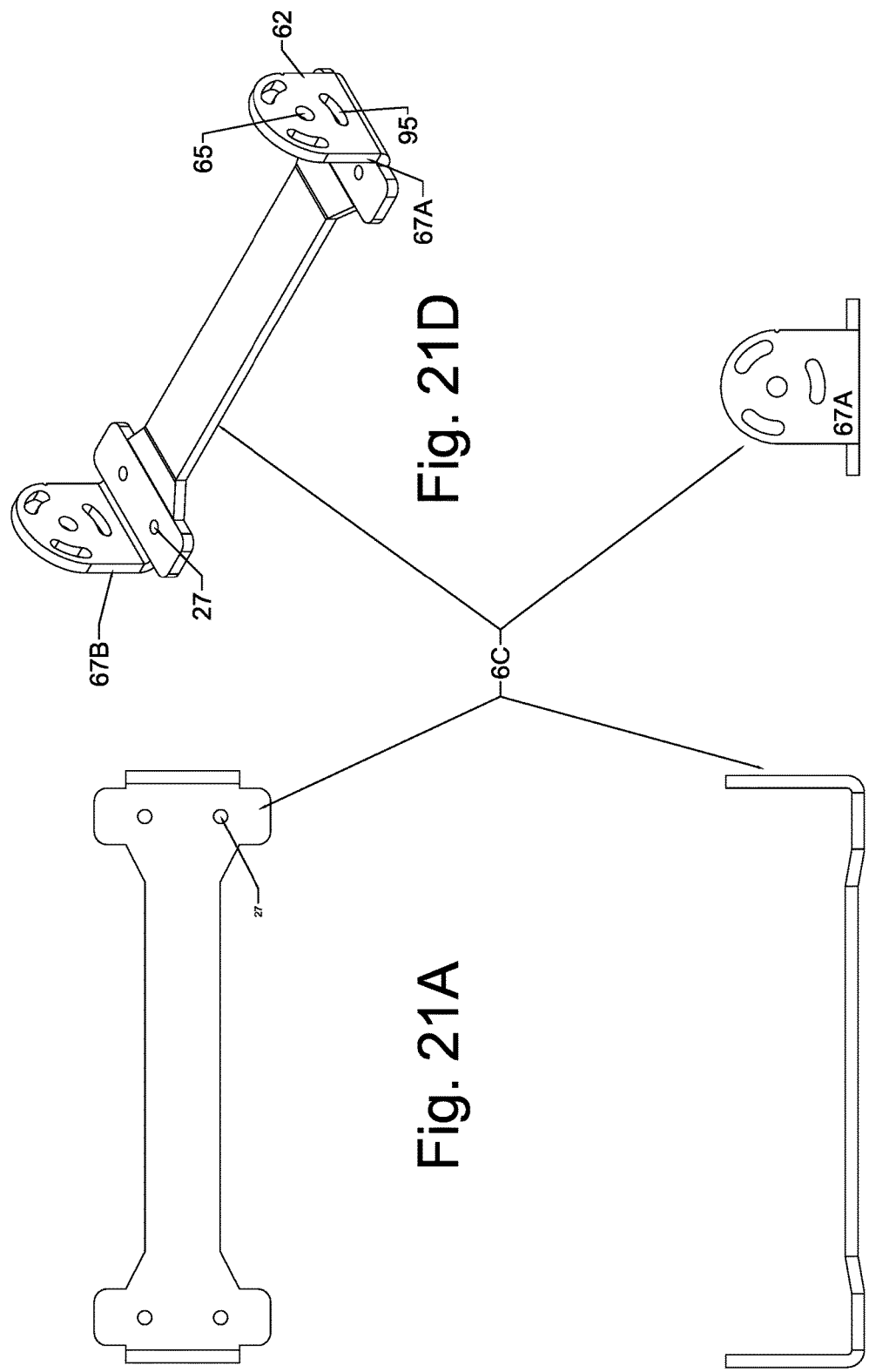

SECURELY FIXABLE VEHICULAR DISPLAY MOUNTING SYSTEM

The present application is a continuation of U.S. Ser. No. 15/881,771 which claims priority to U.S. Provisional Application Ser. No. 62/451,577 filed Jan. 27, 2017, and is incorporated herein by reference.

FIELD OF THE INVENTION

The present invention relates to a mounting system adapted to securely fix an electronic apparatus, such as a display screen, to a vehicle. The system is particularly optimized for use in nautical settings but is readily adapted for use on other vehicles where operators or passengers wish to adjustably mount electronic apparatus.

BACKGROUND OF THE INVENTION

In boating, it has become common to utilize numerous electronic devices to facilitate navigation, fishing or exploration, and communication. These electronics are more frequently the subject of substantial upgrades than boats or vehicles themselves so that electronic devices such as chart plotters, sonar, radar, fish finders, auto pilots, GPS devices, weather displays and communication devices are often added separate from the purchase of the boat itself. When adding electronics to a boat or other vehicle, it is desirable that the mount only need be affixed a single time even if the electronics are subsequently changed, that a certain amount of adjustability is provided for positioning the electronic screens and components, and that great stability be provided for the displays over an extended period of use. Numerous efforts have been made to provide suitable mounts including those designed by Ram Mount and described in U.S. Re. 43,806 and related patents, the Balz Out line of mounts, and structures from both Precision Sonar and Bass Boat Technologies.

As the availability of add-on electronic devices for vehicles has increased over the previous decades from predominantly radio-telecommunication type devices to the present wide assortment of graphs and other electronics, so too have the mounting options for these electronics. In many cases, the manufacturers of the electronics provide simple bolt-on gimbal mounts, but these are inevitably built to economical cost points, often with thin and flexible metal or injection molded plastic parts. Add-on mounting options have developed to provide a variety of alternatives for the users of after-market electronics.

Boats present the most demanding environment for add-on electronics for several reasons. Although boats will usually not travel at the highest speeds of land and air vehicles, the vibratory forces acting on power boats is generally more severe. In the case of water compared to air vehicles, the greater vibratory forces are caused by the incompressibility of water in comparison to air, so that a boat encountering choppy water at any substantial speed leads to vibrations and impact forces on the boat hull. Similarly, in the case of water compared to land vehicles, the land vehicles are generally equipped with resilient tires and suspension systems to lessen the vibrations experienced while the boat hull receives a constant series of impacts. Of course, each of these powered vehicles are subject to additional vibrations from their engines.

Another reason for the more demanding environment in the case of water vehicles is the sheer number of add-on electronics utilized on boats. Furthermore, even with progress in reducing the size of individual electrical components, these apparatus are becoming larger and heavier. So for instance in 2018, a relatively small fresh water fishing boat might be equipped with two 16 inch video screen-type displays on a single mount. Each such display can weigh about 7 to 9 pounds resulting in a single mount carrying 15 to 20 pounds of electronics, weight that is subject to hours of vibration and multi-G forces from impact when the vehicle passes over waves or even ripples at high speed.

Additionally, deployment of electronics on personal watercraft more readily exposes the apparatus to sun and water than would be the case than when mounted in cabins of personal land vehicles or aircraft.

The prior art mounts suffer from one or more of three typical shortcomings: durability, lack of adjustability, or general flimsiness contributing to undesired movement. As previously mentioned, many electronic apparatus are provided with injection molded plastic gimbal mounts that simply lack adequate strength and ruggedness. Other mounts may be fixed so that it is difficult to either change out the electronic apparatus or to adjust the position of the apparatus to an optimal position. The lack of durability has become more pronounced as electronics have become larger and heavier. Many adjustable mounting systems provide only a single joint to support the entire apparatus. In addition, some joints rely upon gripping rubberized surfaces that wear with continual exposure to vibration and impact forces and become difficult to securely fasten. The vibration and repeated impact causes damage to the rubberized surfaces and reduces the effectiveness of the joint.

A key to the present mounting system is the use of a securely fixable joint structure with durable surfaces, and typically two such joints, while restricting the movement of the electrical apparatus to a somewhat limited range rather than attempting full three-axis movement.

The present system is also designed to provide secure and watertight mounting to a boat deck or console, and while providing secure adjustment relative to the mount base. In furtherance of these objectives, a flange may be bolted around the edge of an opening in a boat's console or deck, with recessed openings in the flange for hex-bolt heads; weather covers may be attached to a mounting plate fixed to the flange to protect cable openings from water; and sandwiching OEM gimbal mount devices with braces of relatively substantial design may provide additional stability and security. Novel multi-fastener fixable joint adjustments are utilized to provide further security, allowing adjustment without entirely removing the fasteners.

BRIEF DESCRIPTION OF THE DRAWINGS

The features of the invention will be better understood by referencing the accompanying drawings depicting various embodiments of the invention.

FIG. 20A is a top plan view of a console double top bar mount as shown in FIG. 7C;

FIG. 20B is a front plan view of a console double top bar mount of FIG. 20A;

FIG. 20C is a right side plan view of a the console double top bar mount of FIG. 20A;

FIG. 20D is a perspective view of the console double top bar mount of FIG. 20A;

FIG. 21A is a top plan view of a console double top bar base as shown in FIG. 7B;

FIG. 21B is a front plan view of a console double top bar base of FIG. 21A;

FIG. 21C is a side plan view of a console double top bar base of FIG. 21A;

FIG. 21D is a perspective view of a console double top bar base of FIG. 21A;

DETAILED DESCRIPTION OF THE DRAWINGS

Figure 1A:
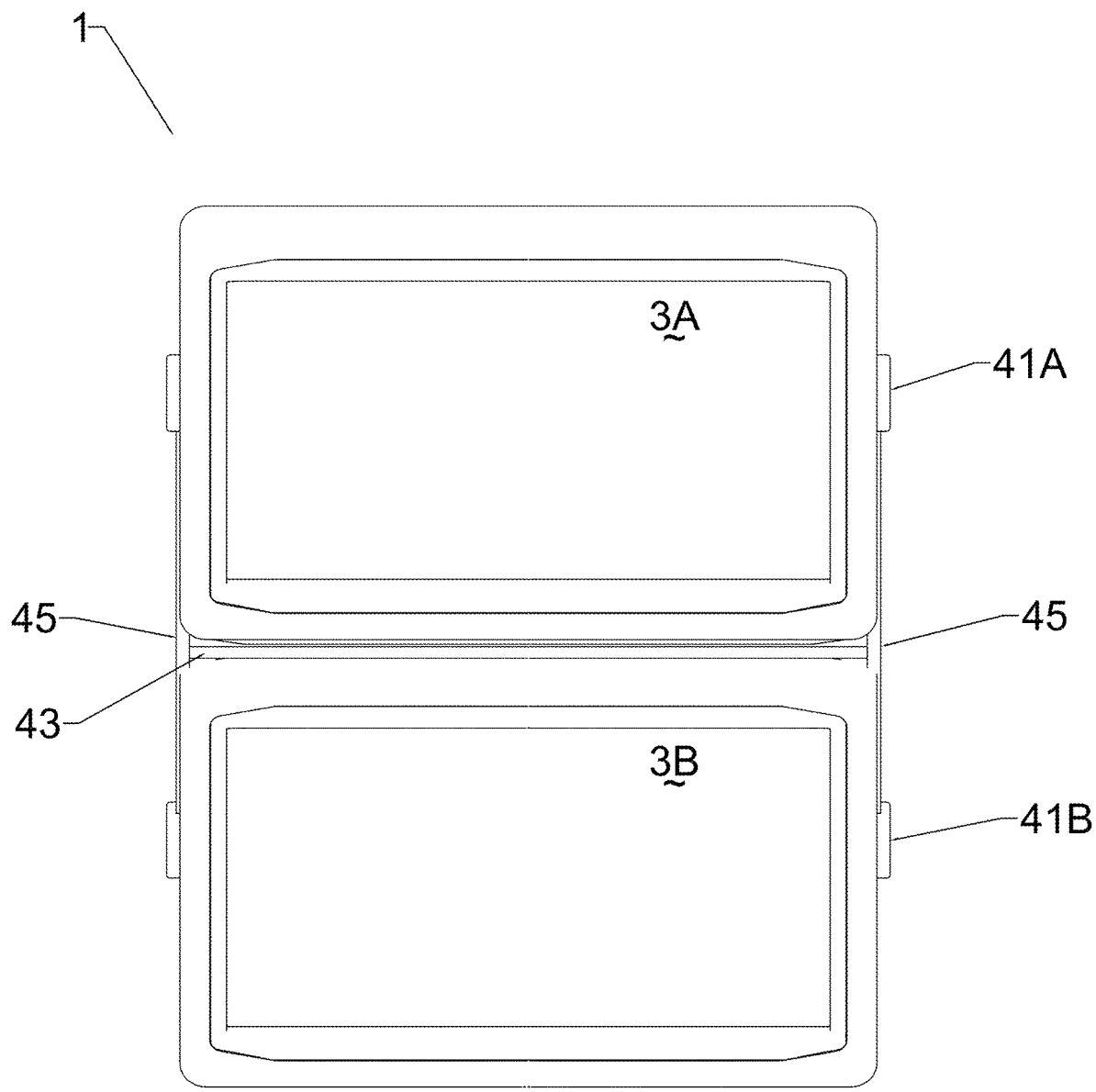
FIG. 1A is a top plan view of a double bow assembly holding two electronic display screens.
Figure 1B:
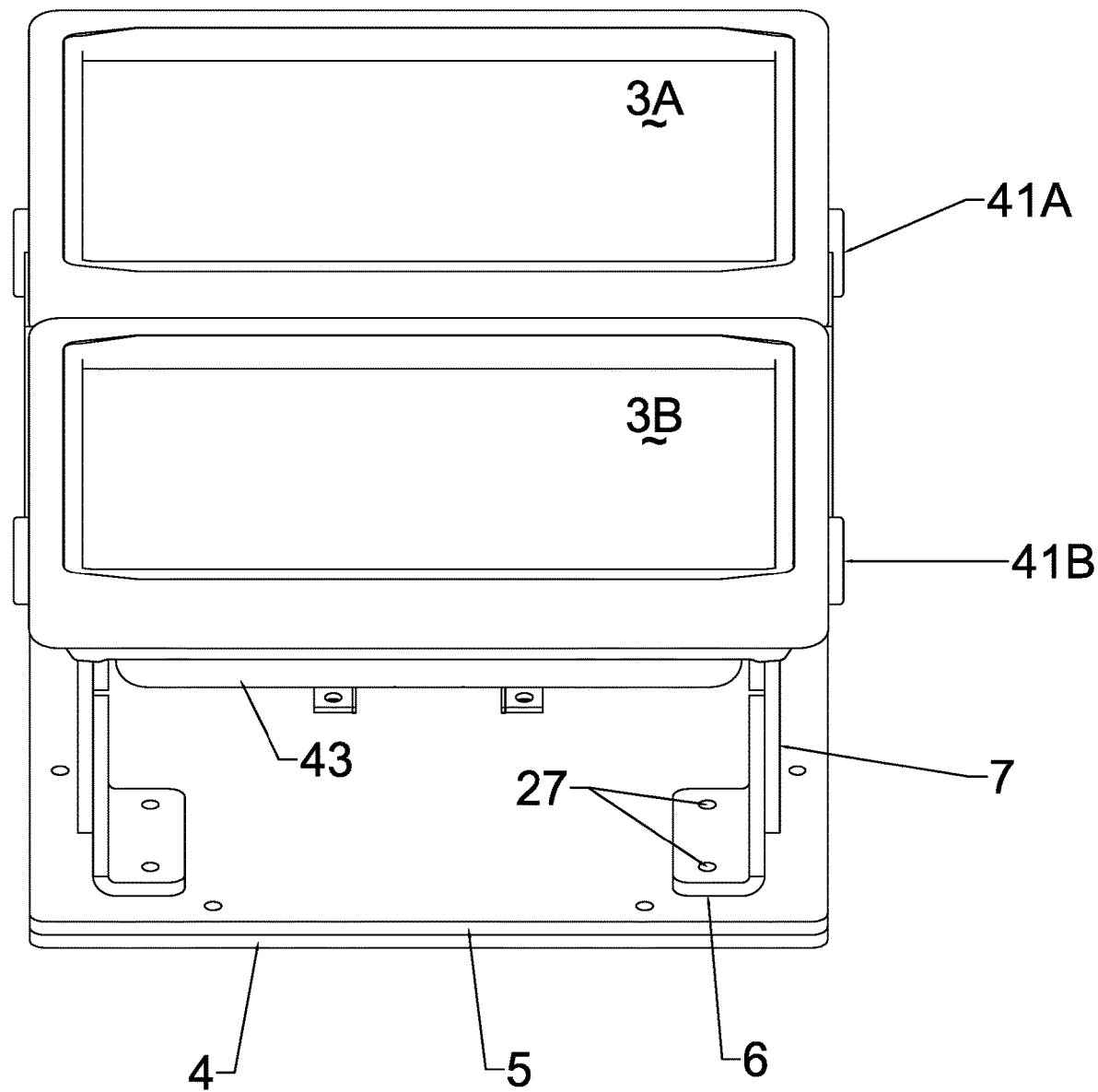
FIG. 1B is a front perspective view of the assembly of FIG. 1A.
Figure 1C:
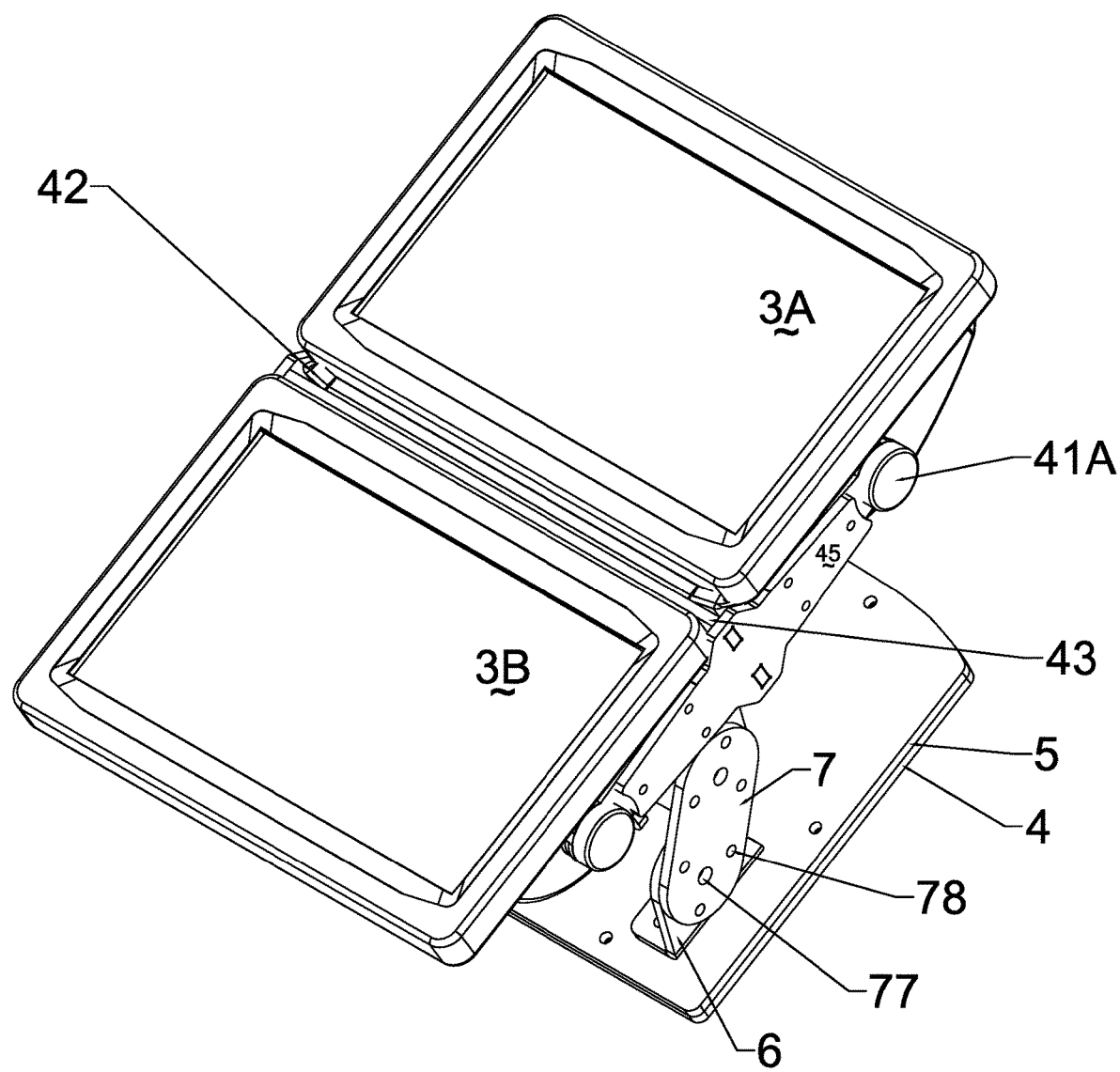
FIG. 1C is a top right perspective view of the assembly of FIG. 1A.
Figure 1D:
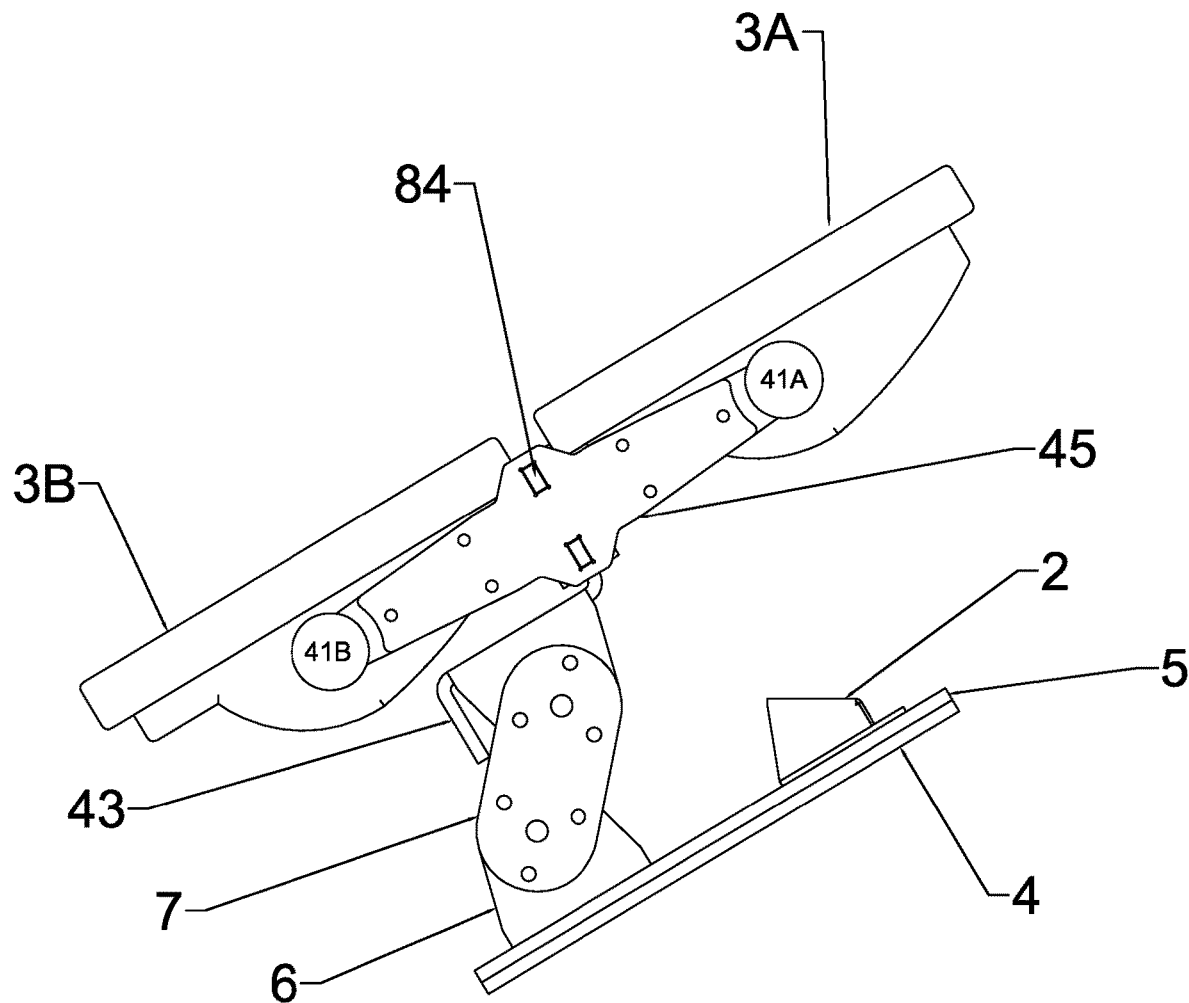
FIG. 1D is a side plan view of the assembly of FIG. 1A.
Figure 1E:
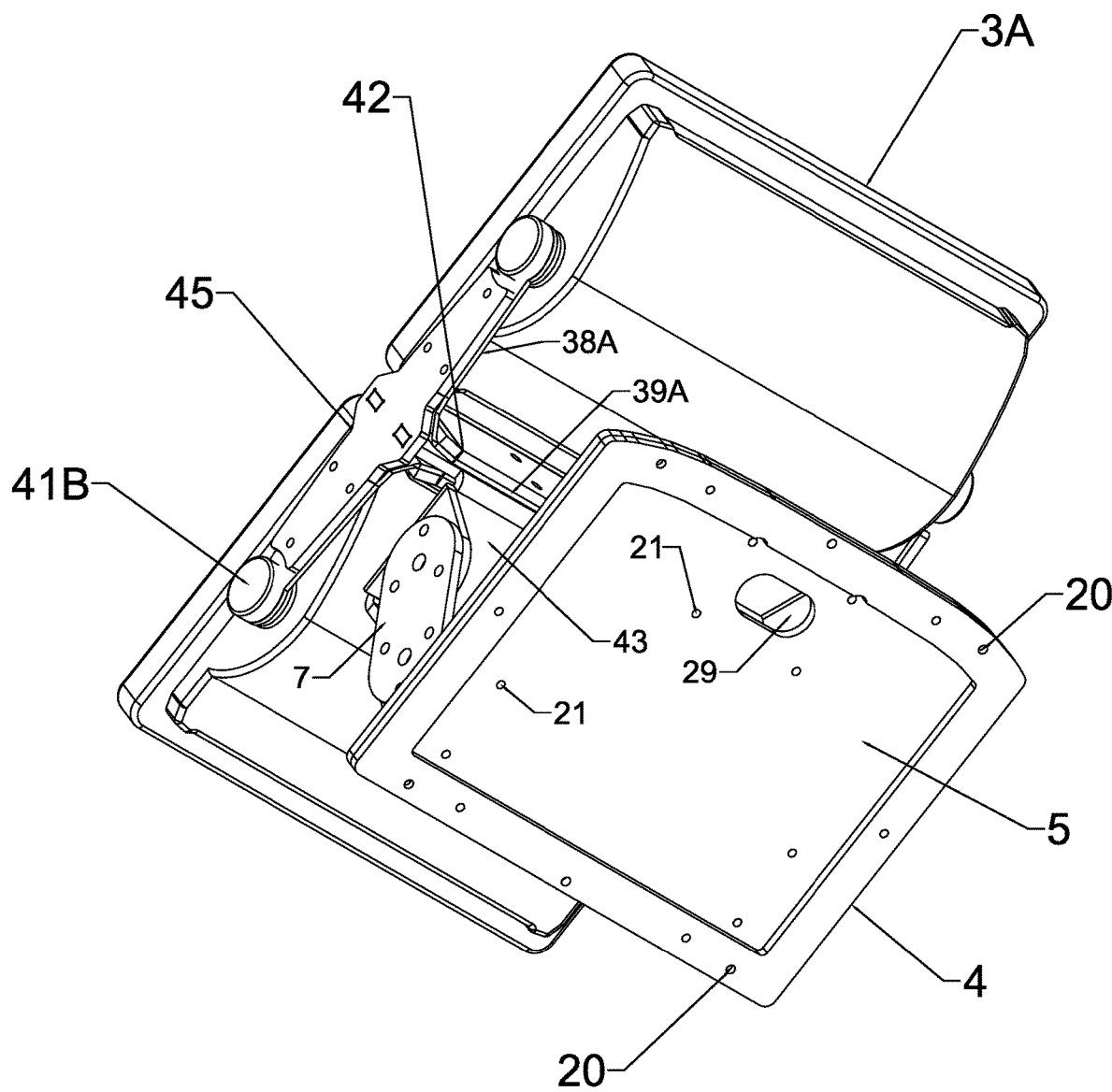
FIG. 1E is a bottom perspective view of the assembly of FIG. 1A.

In nautical applications, the most common mounting positions for electronics are in the bow of the boat or at the console. It is sometimes sufficient to provide a single mounting assembly, but often a dual or double mount is useful so that multiple screens ("graphs") or other electronic devices will be accessible to the crew. Illustrated in FIGS. 1A-1E and 2A-2D is a dual bow assembly which has two generic display screens or "graphs" 3A,3B each coming with rotational attachment to an OEM gimbal bracket 41A,41B which is often of a relatively thin gauge metal or plastic construction and may not be sufficiently durable for high-speed and extended use. The assembly of FIGS. 1 and 2 includes a mounting flange 4 (Seen in bottom perspective in FIG. 1E, and in isolation in FIGS. 9A, 9B) which is attached to an opening in the bow of the boat and is advantageously provided with recessed or countersunk openings 20 near the corners so that it may be fastened to the boat by bolting. The bolts passing through openings 20 advantageously pass through the vehicle structure of the boat deck and are secured on the opposite side of the deck by washers and nuts. The nuts can be accessed through the opening in the deck at the bow of the bow of the boat where the flange is attached, the flange essentially encircling an opening in the vehicle structure. The opening may exist as a result of the design of the vehicle, or may be cut into the vehicle structure. The creation of on opening in the vehicle structure and bolting of the flange through the structure provides a more stable and durable mount than simply screwing a base into the structure. In the case of fiberglass decked boats, the stability of a screw mounted base is likely to be short-lived. After the flange is bolted around an opening, the faceplate 5 can be screwed tightly to the top surface of the flange 4 with threaded fasteners passing through openings 22 (Seen in FIGS. 10A, 10B) of the faceplate 5 into threaded openings 23 (FIGS. 9A, 9B) of FIG. 4. Advantageously, PTFE layers are utilized both between the flange 4 and boat deck and between the mounting plate 5 and the flange 4 to provide a better seal against moisture. Wires connecting the screens 3A,3B to sensors beneath the boat may pass through an opening 29 (FIG. 1E) in the faceplate 5 that is covered by a wireway weather cover 2. Threaded openings 21 around opening 29 in faceplate 5 allow the weather cover 2 to be fastened with screws passing through openings 28 (shown in FIGS. 8). Similarly, the base brackets 6 are fastened to faceplate 5 with screws passing through openings 27 (FIGS. 1B and 11A) into other threaded openings 21.

Two noteable features of the dual mount of FIGS. 1 and 2 are the stabilizing of the gimbal bracket 41A,41B and the adjusting mechanism that operates to provide two axes of movement in the same plane at either end of the connecting arm 7 extending between the top mounting bar 43 and the L-shaped base bracket 6 that is attached to the faceplate 5. The gimbal brackets 41A,41B are stabilized by sandwiching the bottom of each bracket between a gimbal top plate 42 and an upward extending member 8 of the top mounting bar 43. The gimbal top plates 42 provide structural metal support to the bottom portion of the OEM gimbal bases 39. The sides 38 of the gimbal brackets 41A,41B are also stabilized by the use of gimbal side supports 45 that are attached to either side of the top mounting bar 43 with openings 55 on the side supports 45 being fit to end tabs 84 on the upstanding portion 8 of top mounting bar 43. So the bottom of the gimbal bracket is sandwiched between a top plate and the mounting bar while the sides of the gimbal brackets are secured to side supports that extend generally perpendicular to the mounting surface of the mounting bar.

Figure 2A:
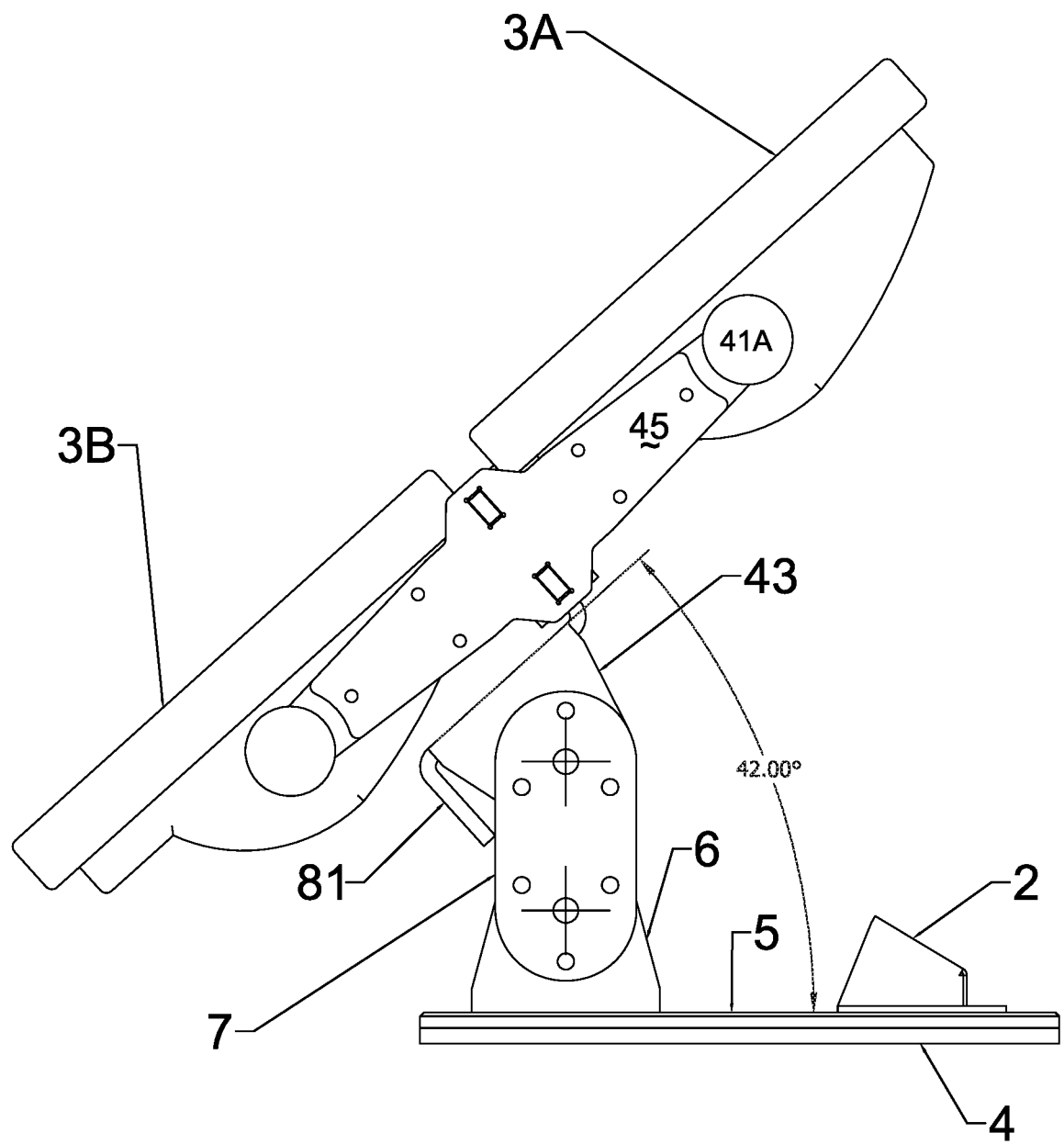
FIG. 2A is a right side plan view of the assembly of FIG. 1A in which the upper adjustment mechanism is rotated rearward and the lower adjustment mechanism is in a neutral vertical position.
Figure 2B:
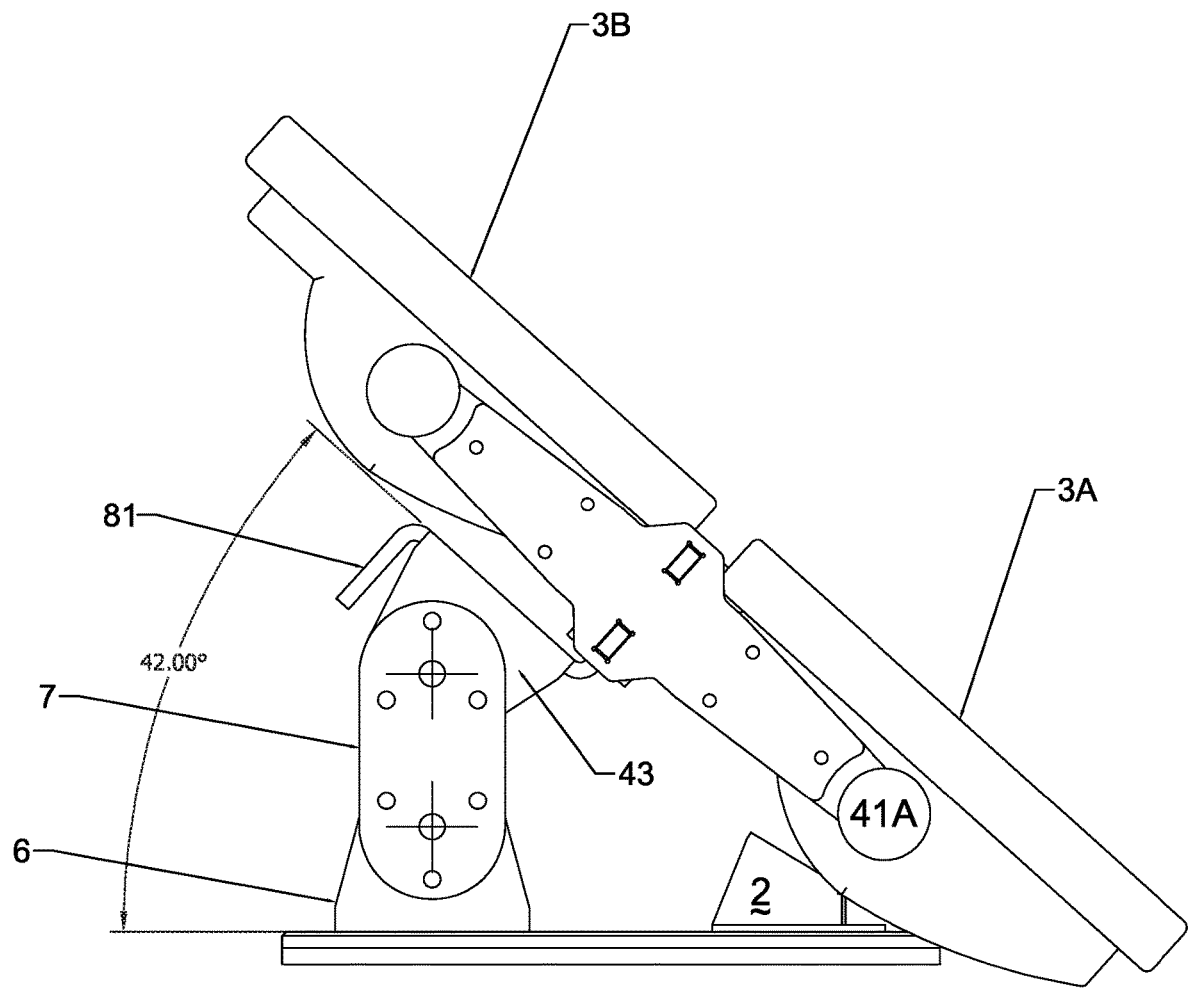
FIG. 2B is a right side plan perspective view of the assembly of FIG. 1A with the upper adjustment mechanism rotated in its forward-most position and the lower adjustment mechanism in a neutral vertical position.
Figure 2C:
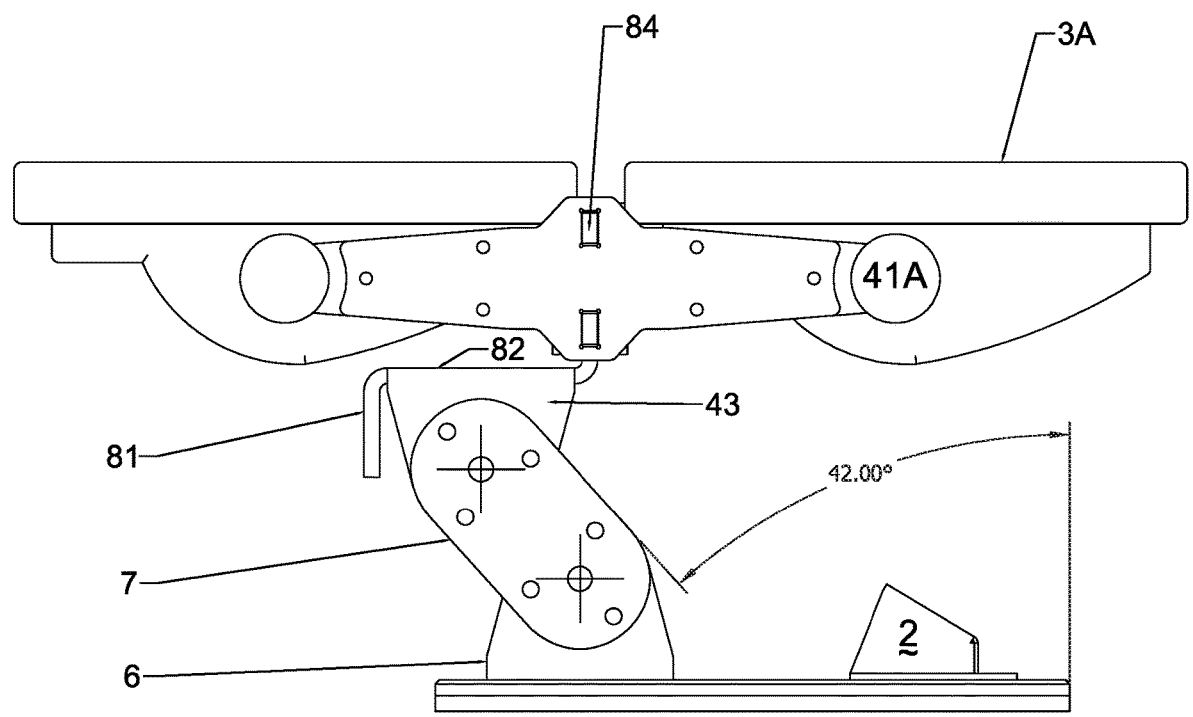
FIG. 2C is a right side plan view of the assembly of FIG. 1A with the upper adjustment mechanism in its forward position and the lower adjustment mechanism in a rearward position.
Figure 2D:
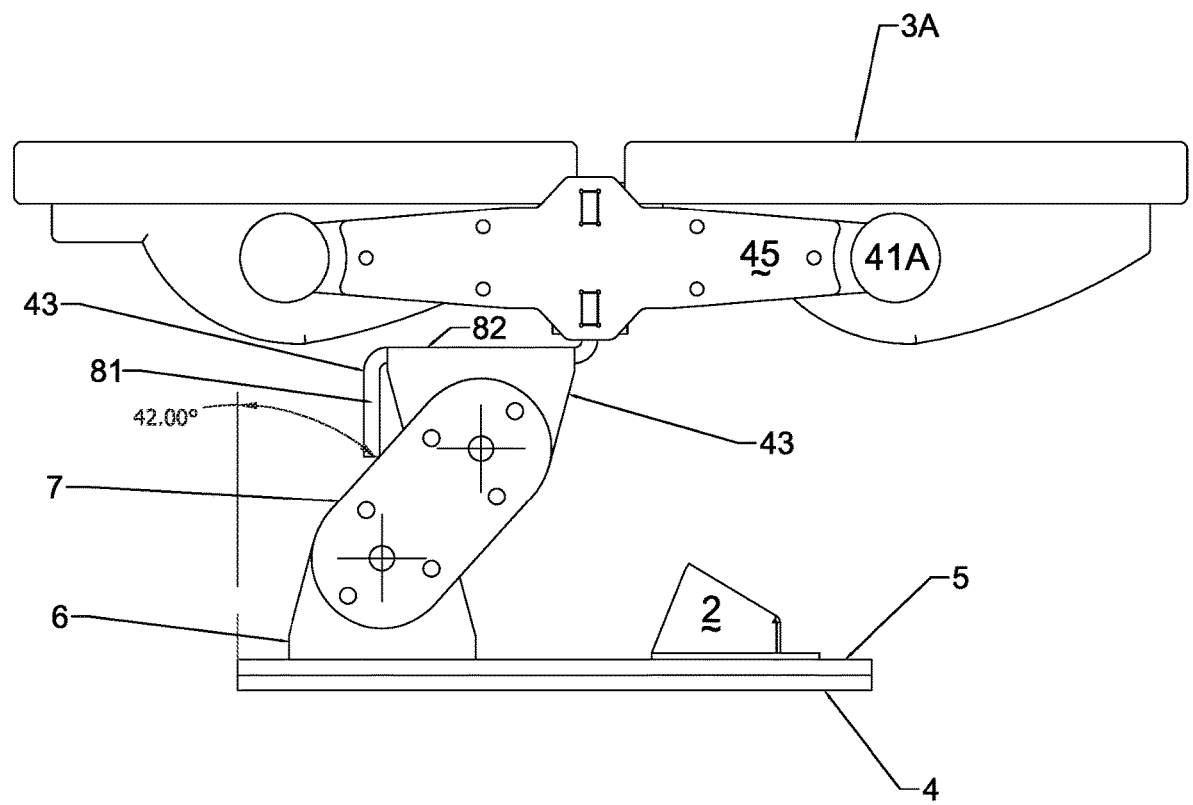
FIG. 2D is a right side plan view of the assembly of FIG. 1A with the upper adjustment mechanism in its rearward position and the lower adjustment mechanism in its forward position.
Figure 3A:
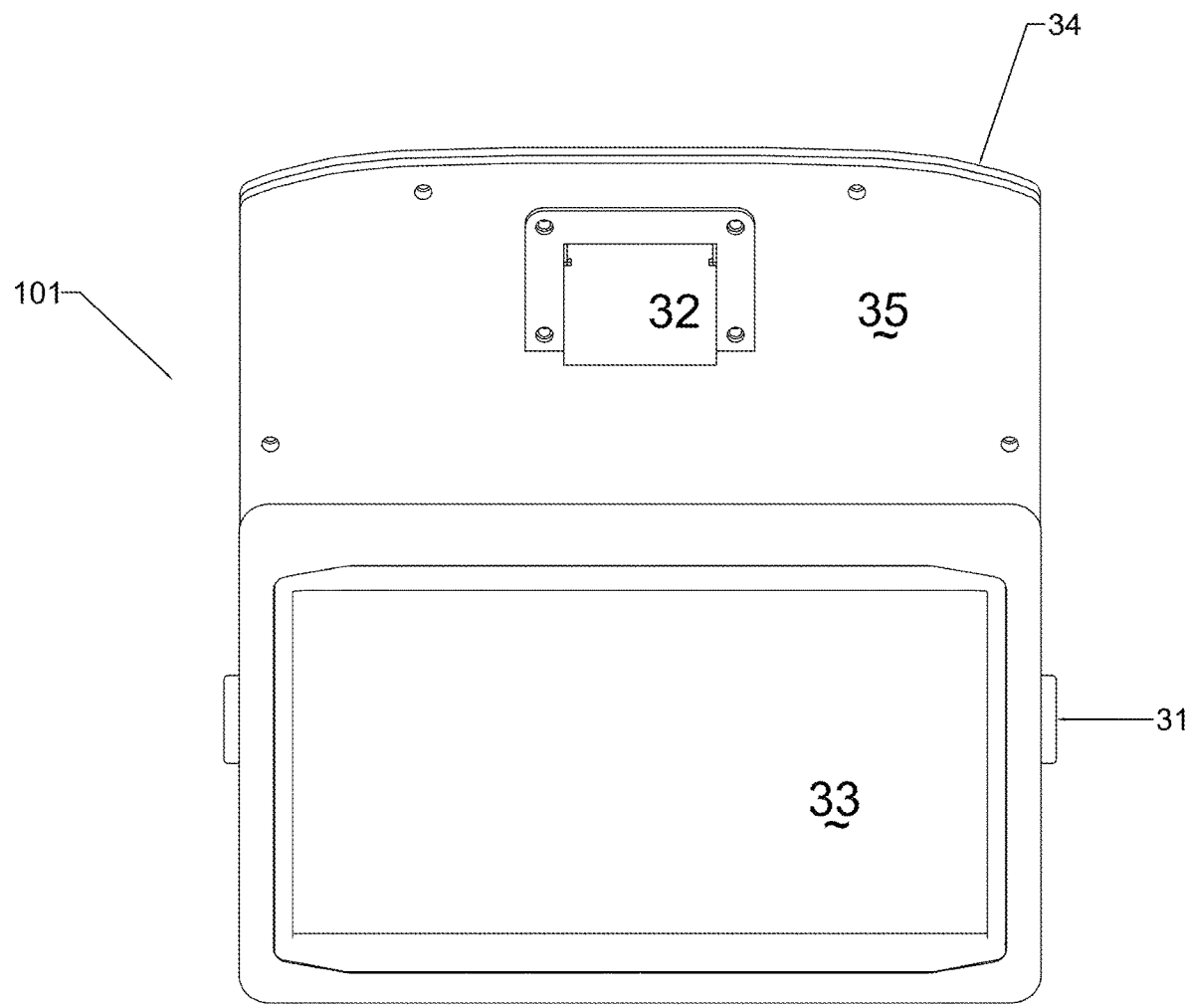
FIG. 3A is a top plan view of a single bow assembly with electronic screen.
Figure 3B:
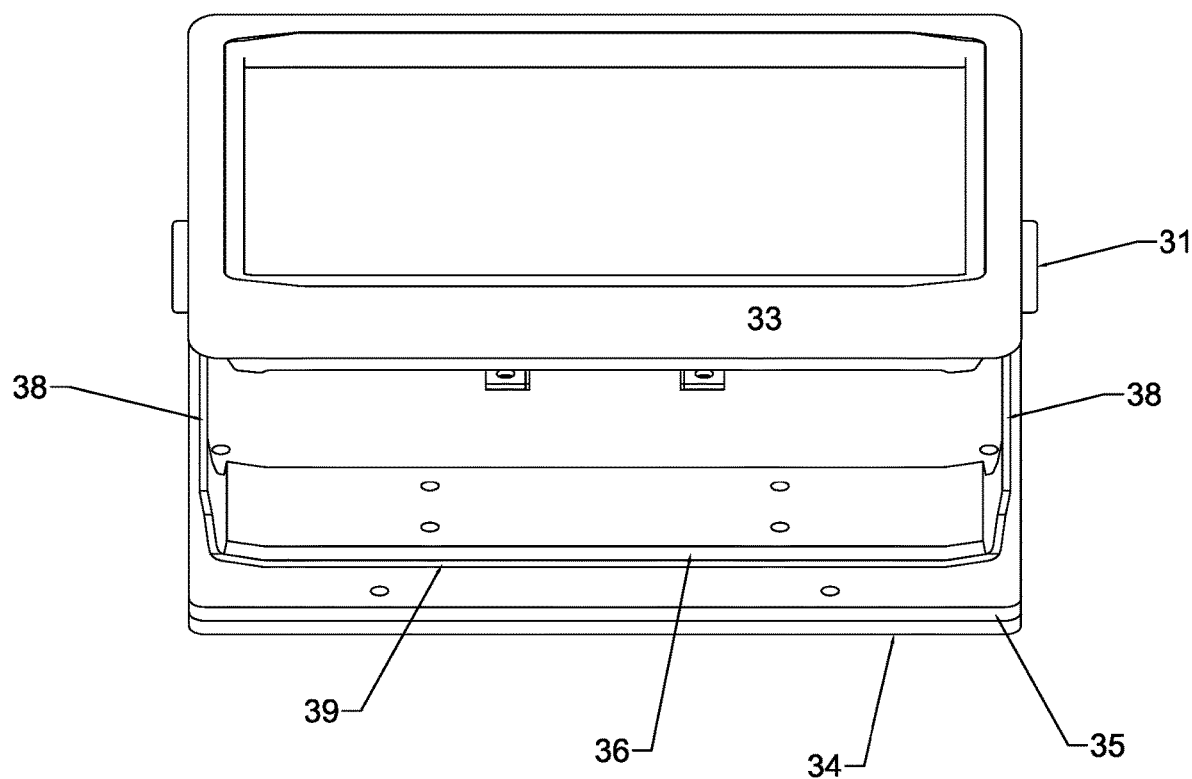
FIG. 3B is a front perspective view of the assembly of FIG. 3A.
Figure 3C:
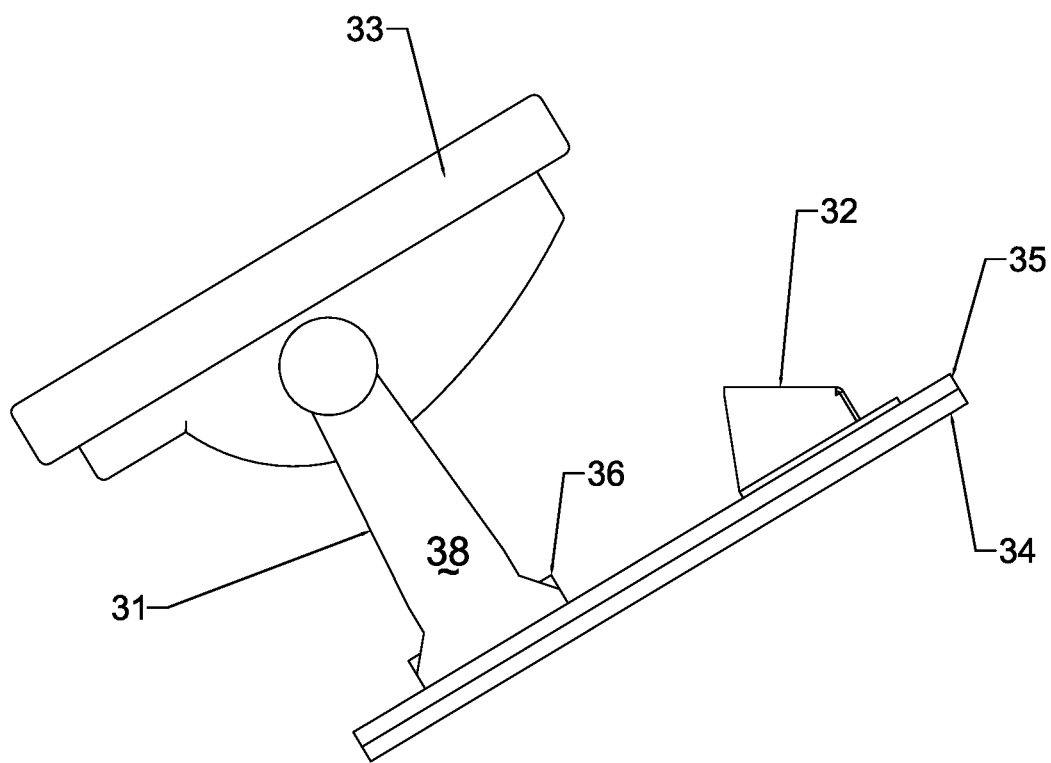
FIG. 3C is a side plan view of the assembly of FIG. 3A.
Figure 3D:
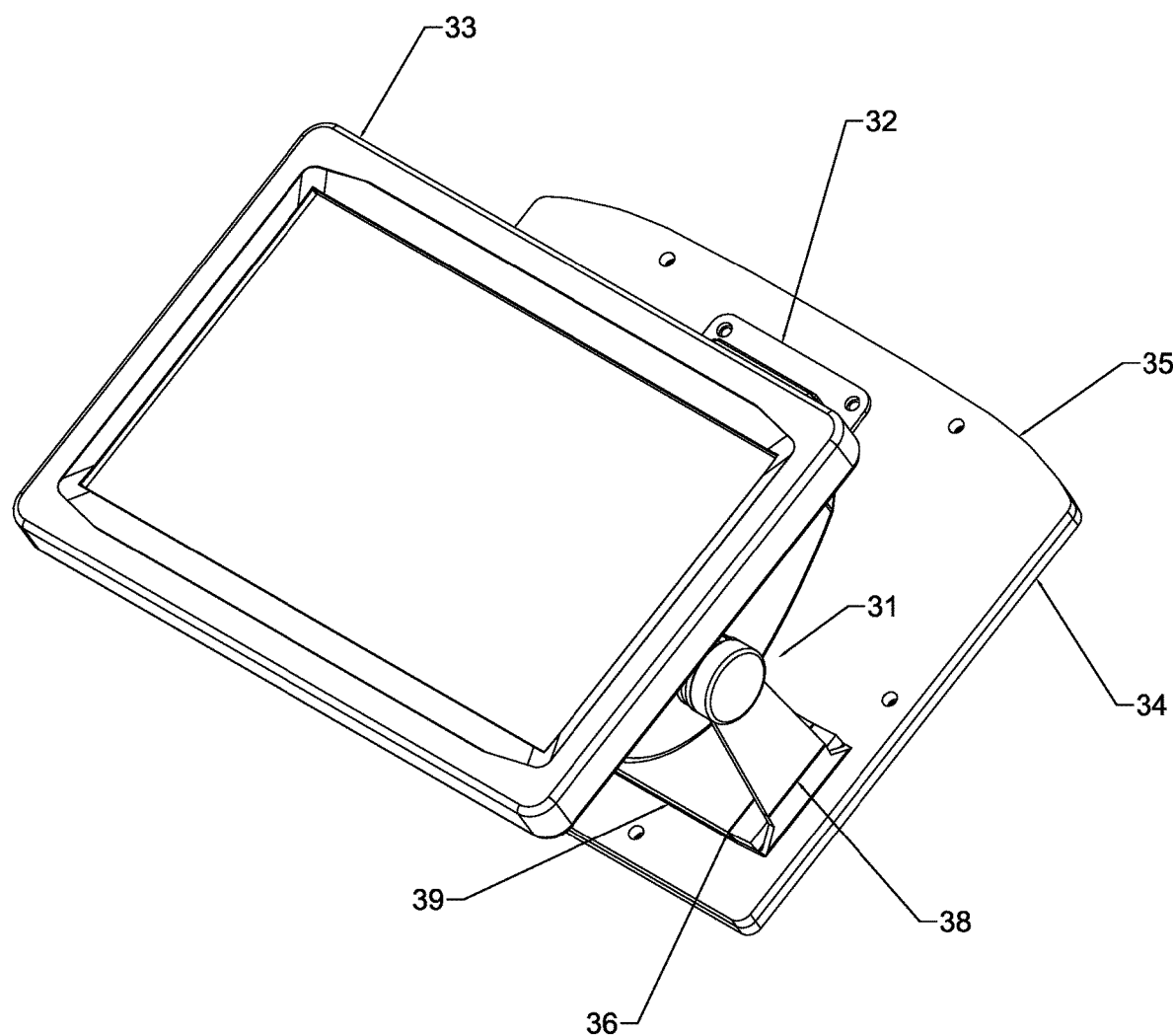
FIG. 3D is a top right perspective view of the assembly of FIG. 3A.

FIGS. 2A through 2D illustrate the two axes of rotational adjustment. In FIG. 2A, the upper adjusting mechanism between the top mounting bar 43 and connecting arm 7 is rotated rearward through 42° range of motion, while the lower adjusting mechanism remains in its neutral upright position. In FIG. 2B, the same upper adjusting mechanism is rotated forward by 42°, thus demonstrating the full 84° range of motion in the illustrated upper adjustment mechanism. Generally, it is preferred that adjusting mechanisms of the present invention have a full range of motion of between 60° and 100°. FIG. 2C illustrates the lower adjustment feature being positioned rearward by 42° from the vertical position that it occupied in FIGS. 2A and 2B with the upper adjustment mechanism rotated forward, while FIG. 2D shows the lower adjustment feature having been rotated forward by 42° with the upper adjustment mechanism having been rotated rearward. The combination of the upper and lower adjustment features provides the ability to adjust height, some amount of forward to rearward positioning relative to the base, and the tilt orientation of the electronic screens 3A, 3B. The gimbal mount attachments also some rotational position of the screens individually. Note that both axes of rotational movement are in the same plane, parallel to the face of the connecting arm 7 and the upstanding face 67 of the bracket bases 6. If the weather cover 2 is considered the front of the mounting system, it can be seen in FIGS. 2A and 2B that the screens can be tilted to be viewed from either the front (FIG. 2B) or the rear (FIG. 2A). Adding rotational 3-dimensional adjustability in a secure mount presents much more complex design issues.

In FIGS. 3A through 3D, a single bow mount assembly is shown with mounting flange 34, faceplate 35, weather cover 32, and generic electronic screen display 33 that are identical or very similar to those of FIGS. 1 and 2. The gimbal bracket 31 is also typical and is shown with side arms 38 connected by gimbal base 39 sandwiched by gimbal top plate 36 against the faceplate 35. In this instance, the side arms 38 of the gimbal bracket 31 are not supported by reinforcement and the adjustability of the orientation of the electric screen 33 is provided only by rotation with respect to the OEM gimbal bracket 31.

FIGS. 4A through 4E illustrate in greater detail the reinforcement of the gimbal brackets 41 and the upper and lower adjustment features of the dual mount shown in FIGS. 1 and 2. It can be seen in FIG. 4A that first and second gimbal brackets 41A,41B have base sections 39A,39B that are sandwiched between gimbal top plates 42 against an upstanding section 8 of the top mounting bar 43 and that the gimbal bracket arms 38 are secured to the gimbal side supports 45. Even if the gimbal bracket 41 provided with the electronic equipment is of a construction that will not withstand extended vibration and heavy outdoor use, the additional support of rigid metal plates 42 and side supports 45 provides added durability.

Figure 4A:
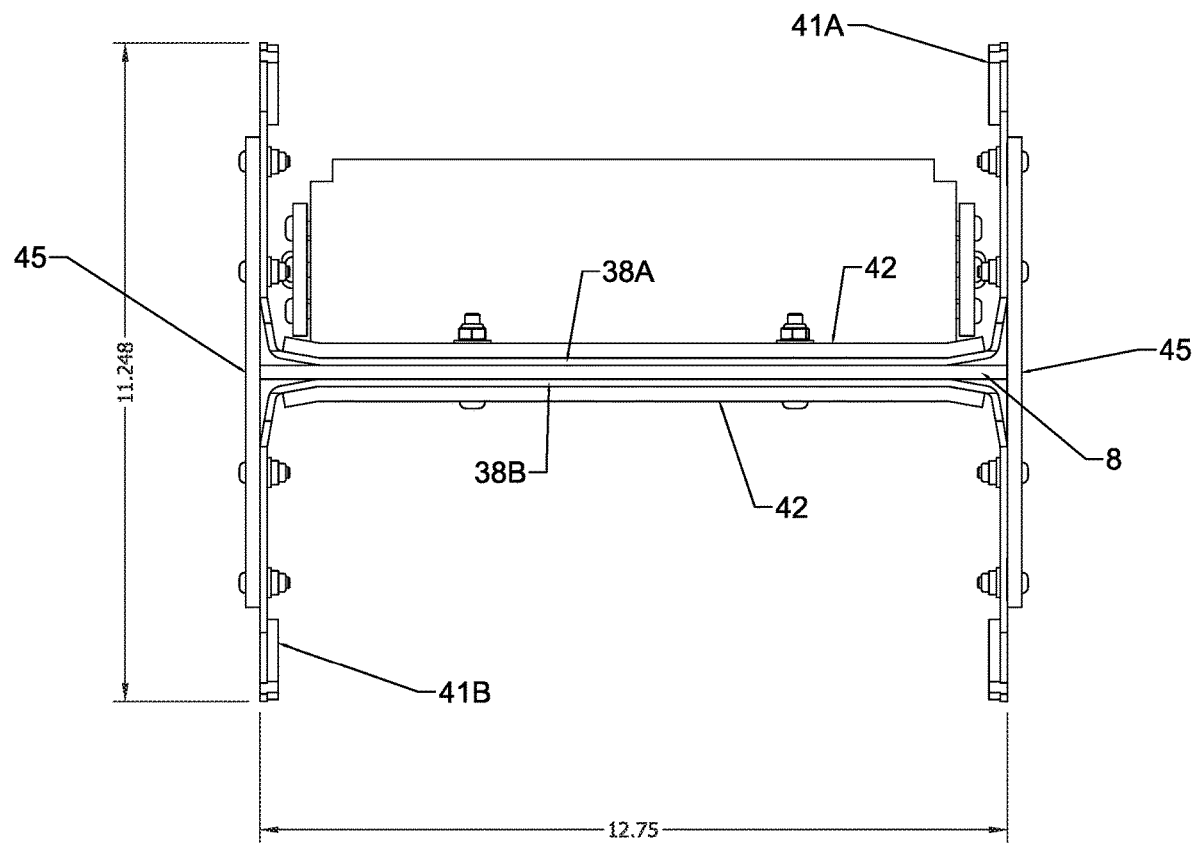
FIG. 4A is a top plan view of a dual mount with no electric display screens in position as in FIG. 1A.
Figure 4B:
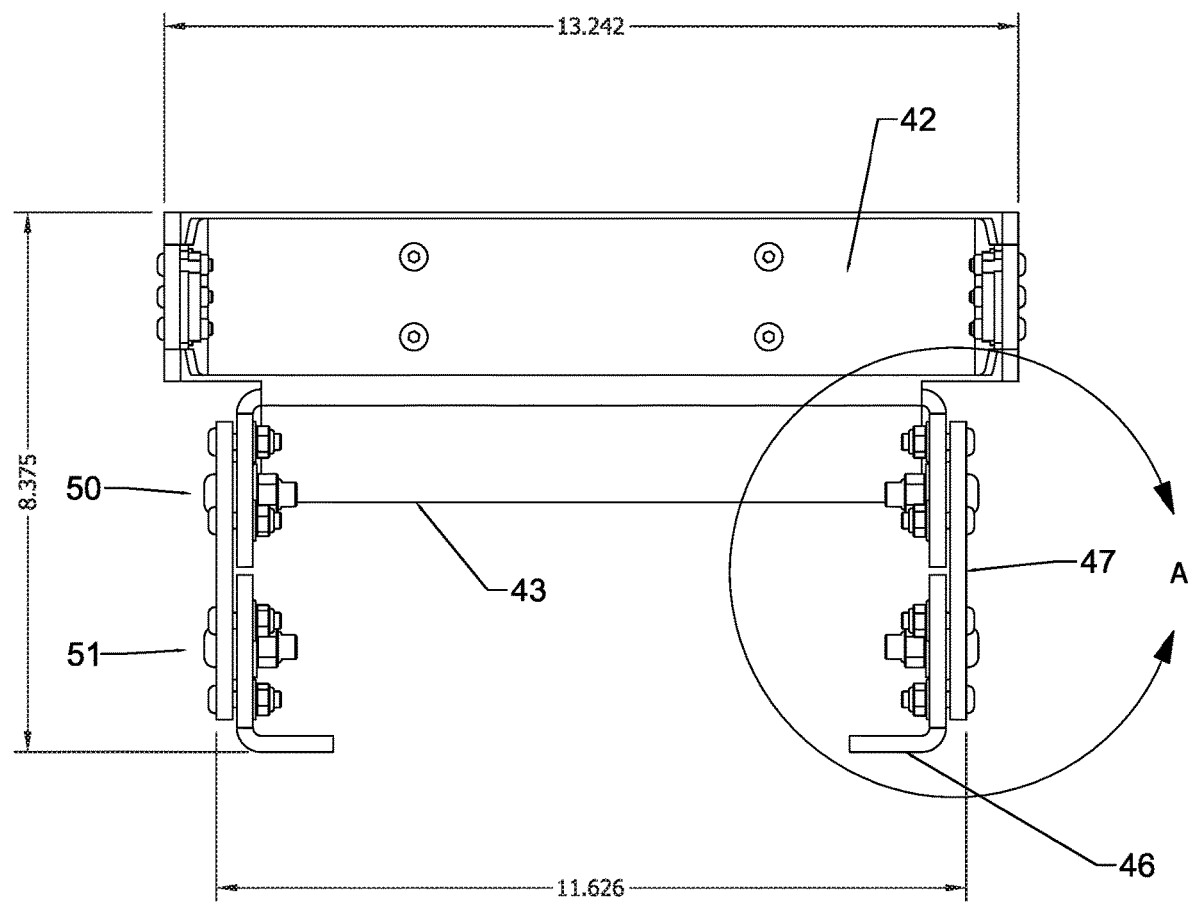
FIG. 4B is a rear plan view of the dual mount of FIG. 4A.

FIG. 4B is a rear plan view of the dual mount where upper adjustment assembly 50 and lower adjustment assembly 51 can be seen in their neutral positions. More detailed view of these upper and lower adjusting features 50,51 is shown in FIG. 4C which represents an enlargement of the encircled area A of FIG. 4B.

Figure 4C:
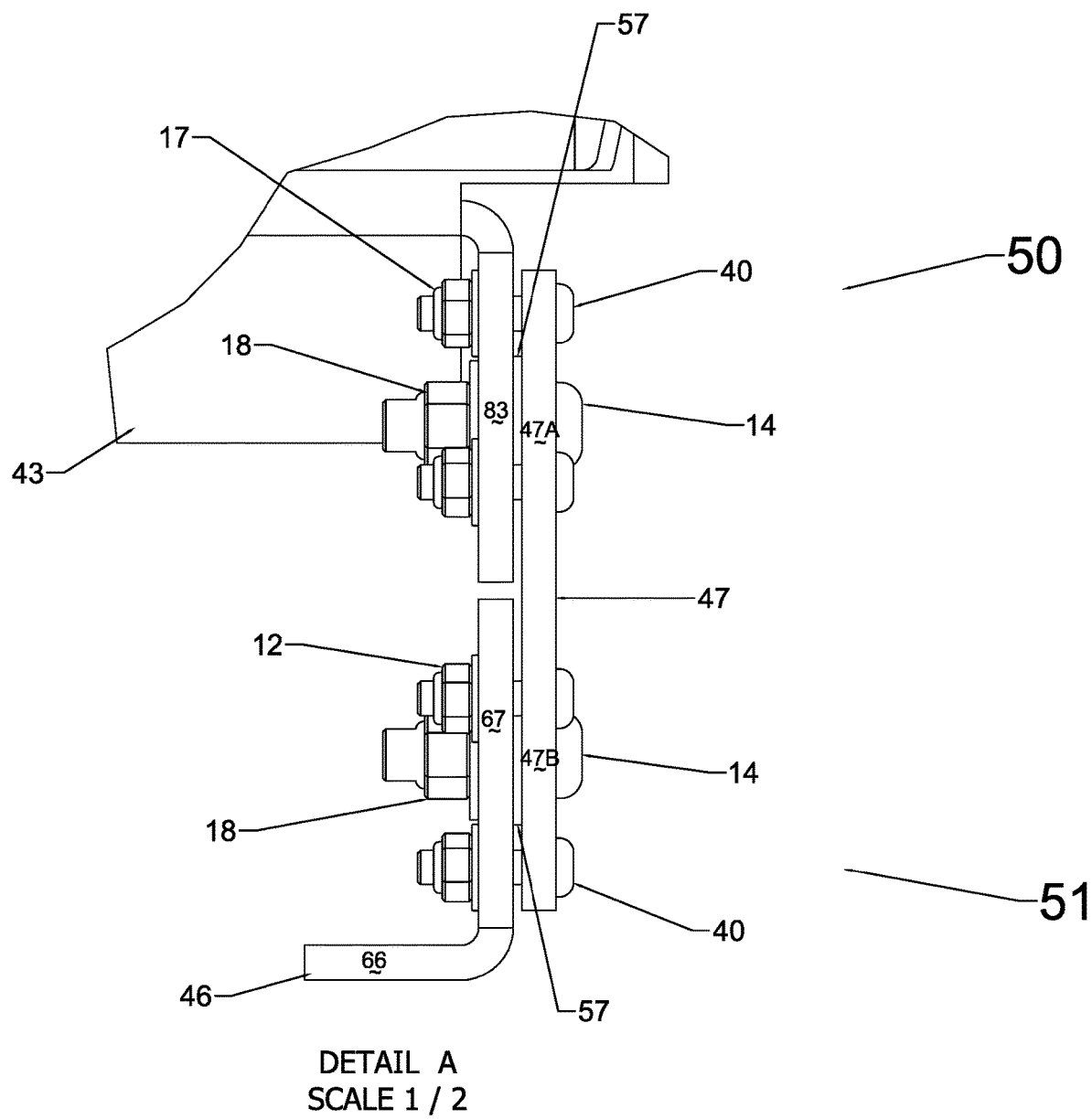
FIG. 4C is an enlarged front plan detail of the upper and lower adjustment assemblies encircled in FIG. 4B.
Figure 4D:
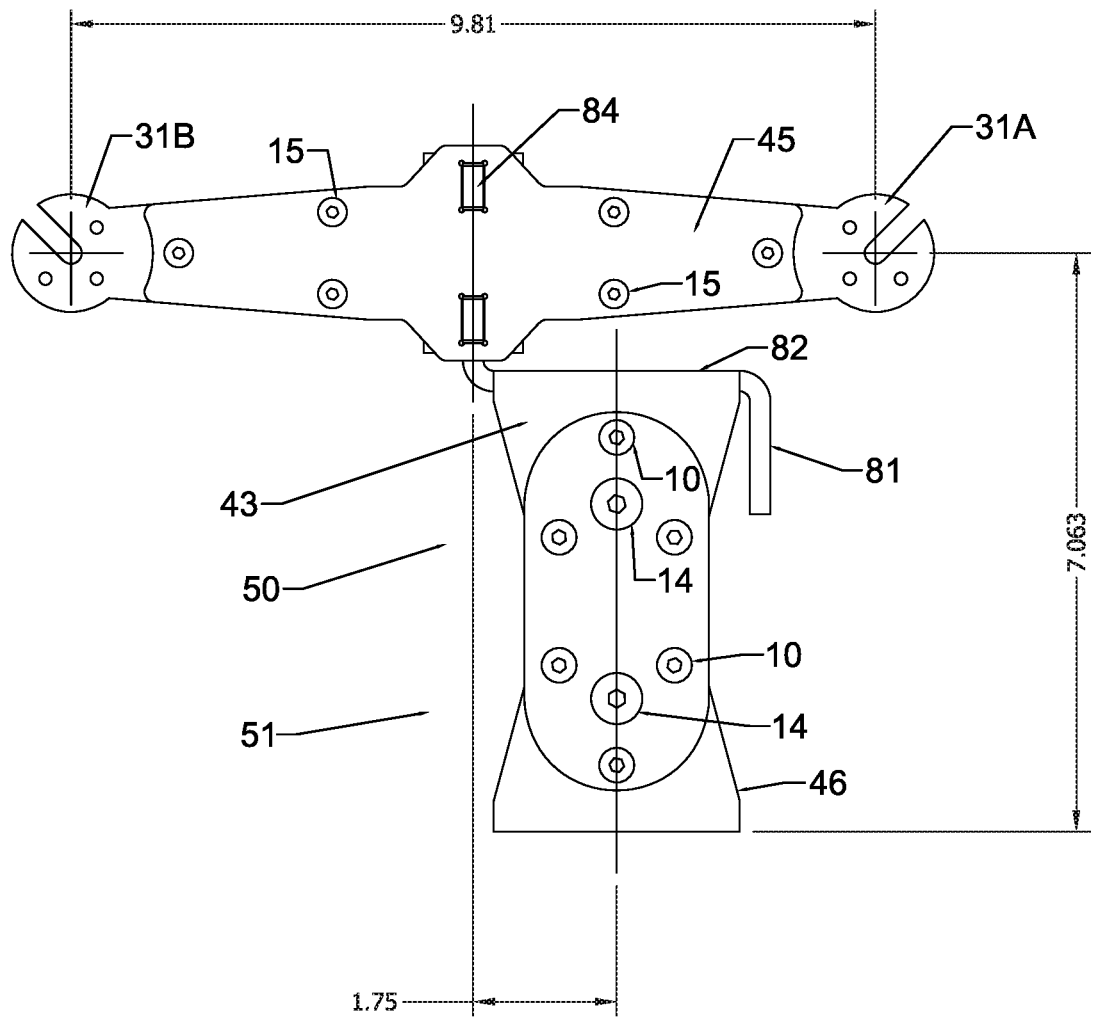
FIG. 4D is a left side plan view of the dual mount of FIG. 4A.
Figure 4E:
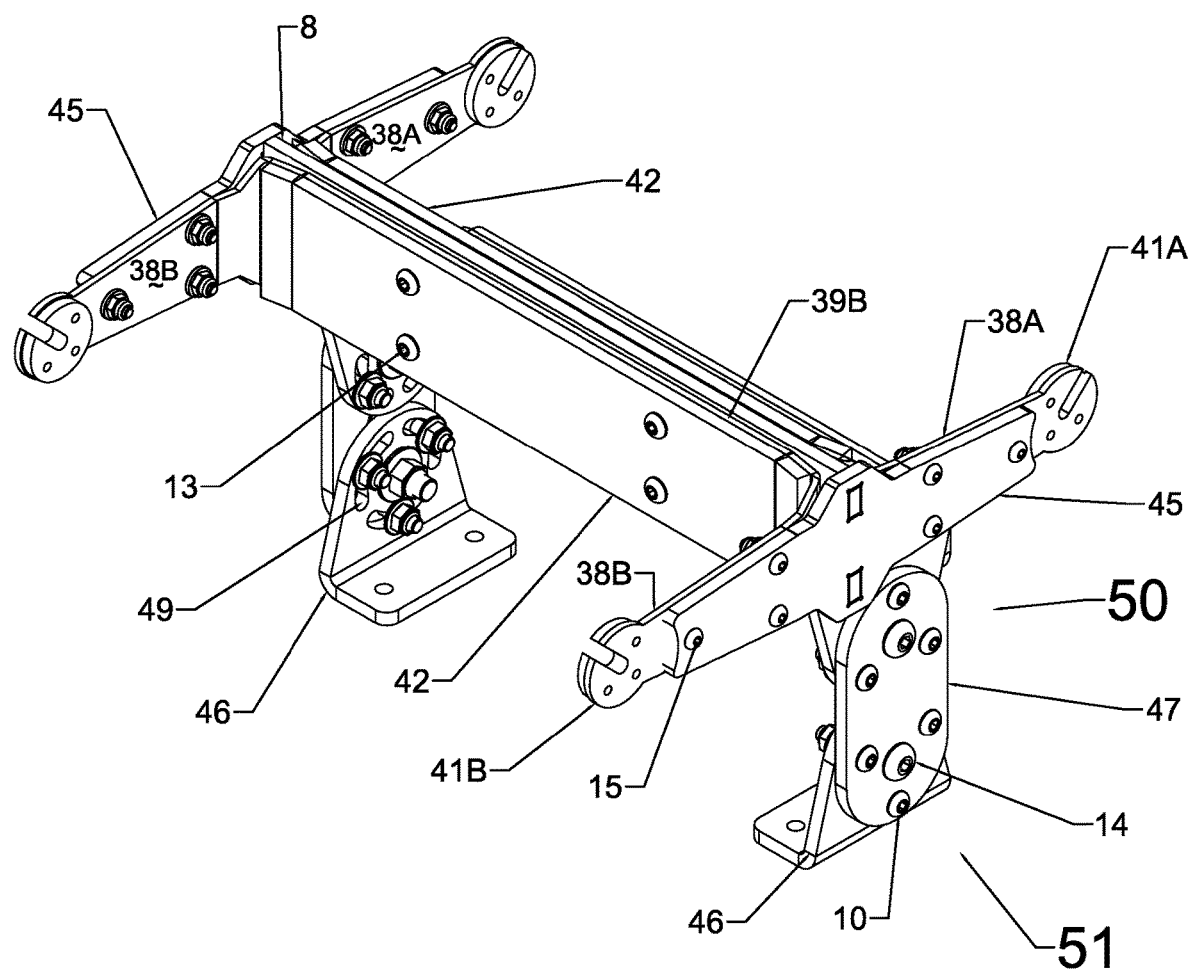
FIG. 4E is a perspective view of the dual mount of FIG. 4A.
Figure 5:
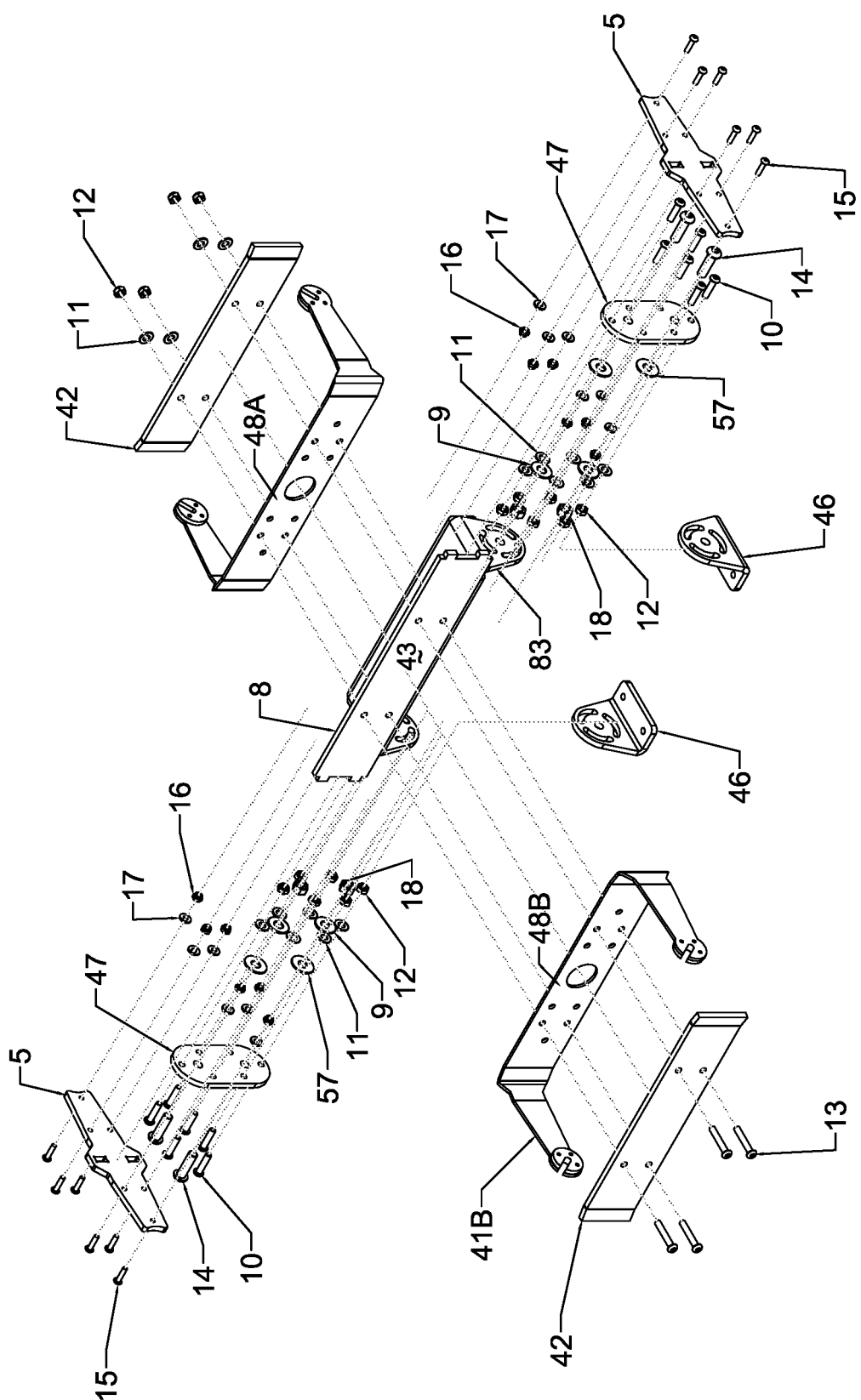
FIG. 5 is an exploded perspective view of the dual mount of FIG. 4A.
Figure 6A:
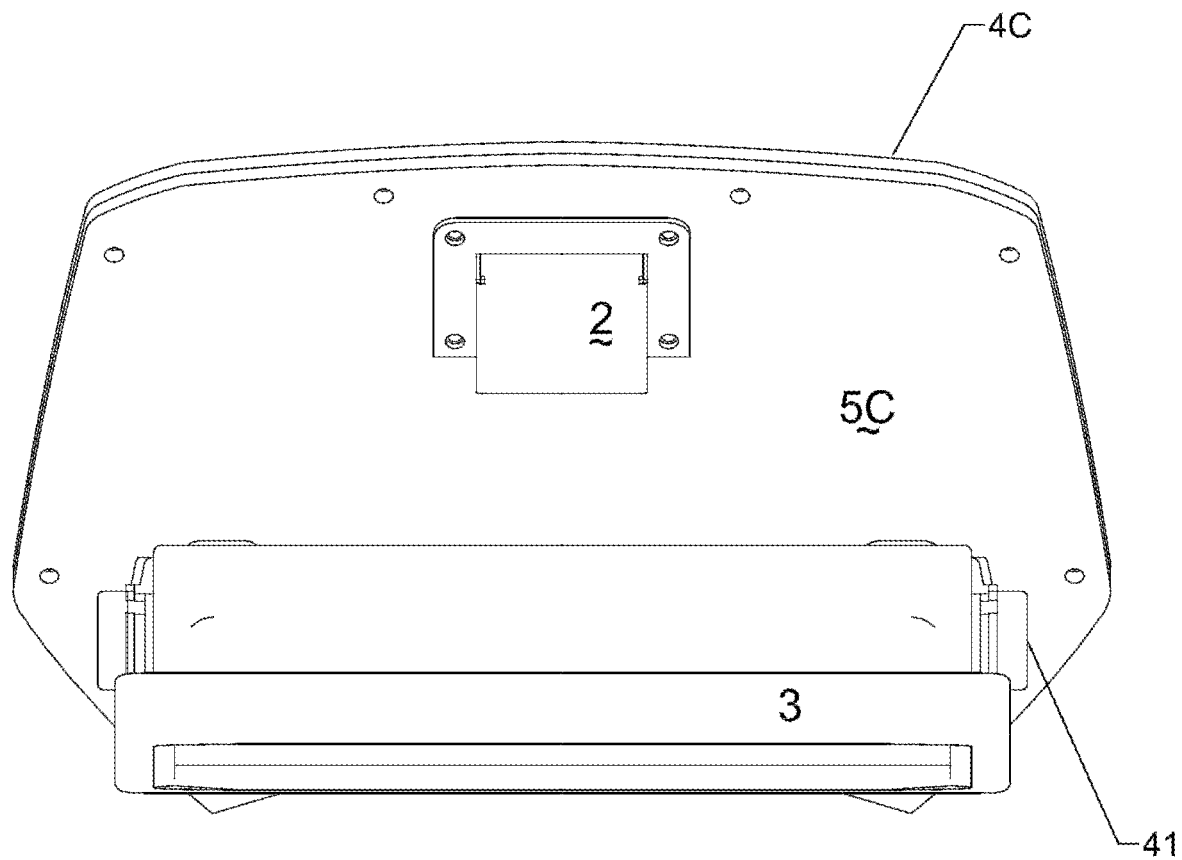
FIG. 6A is a top plan view of a single console mount.
Figure 6B:
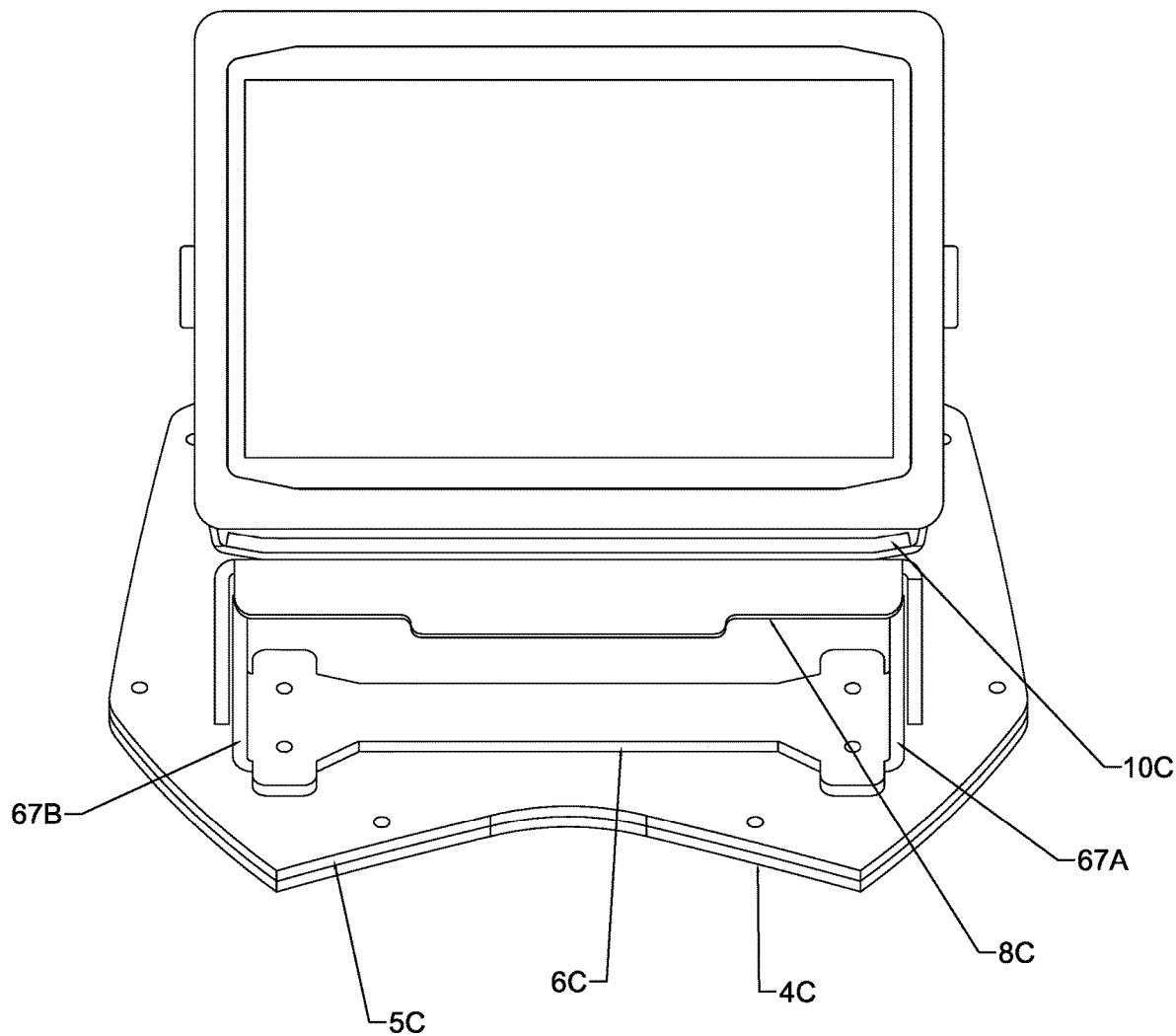
FIG. 6B is a front plan view of the console mount of FIG. 6A with an electronic screen.
Figure 6C:
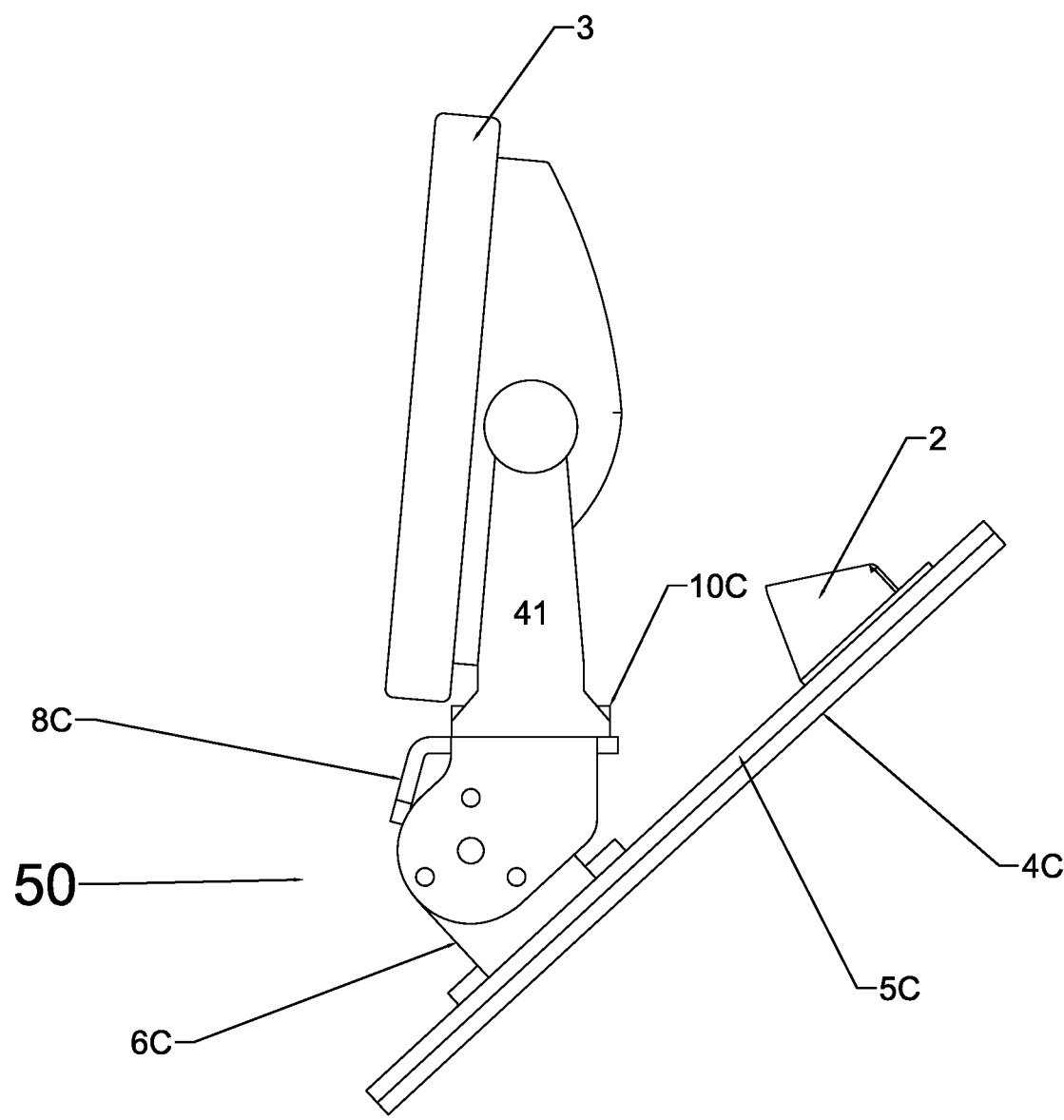
FIG. 6C is a right side plan view of the console mount of FIG. 6B.
Figure 6D:
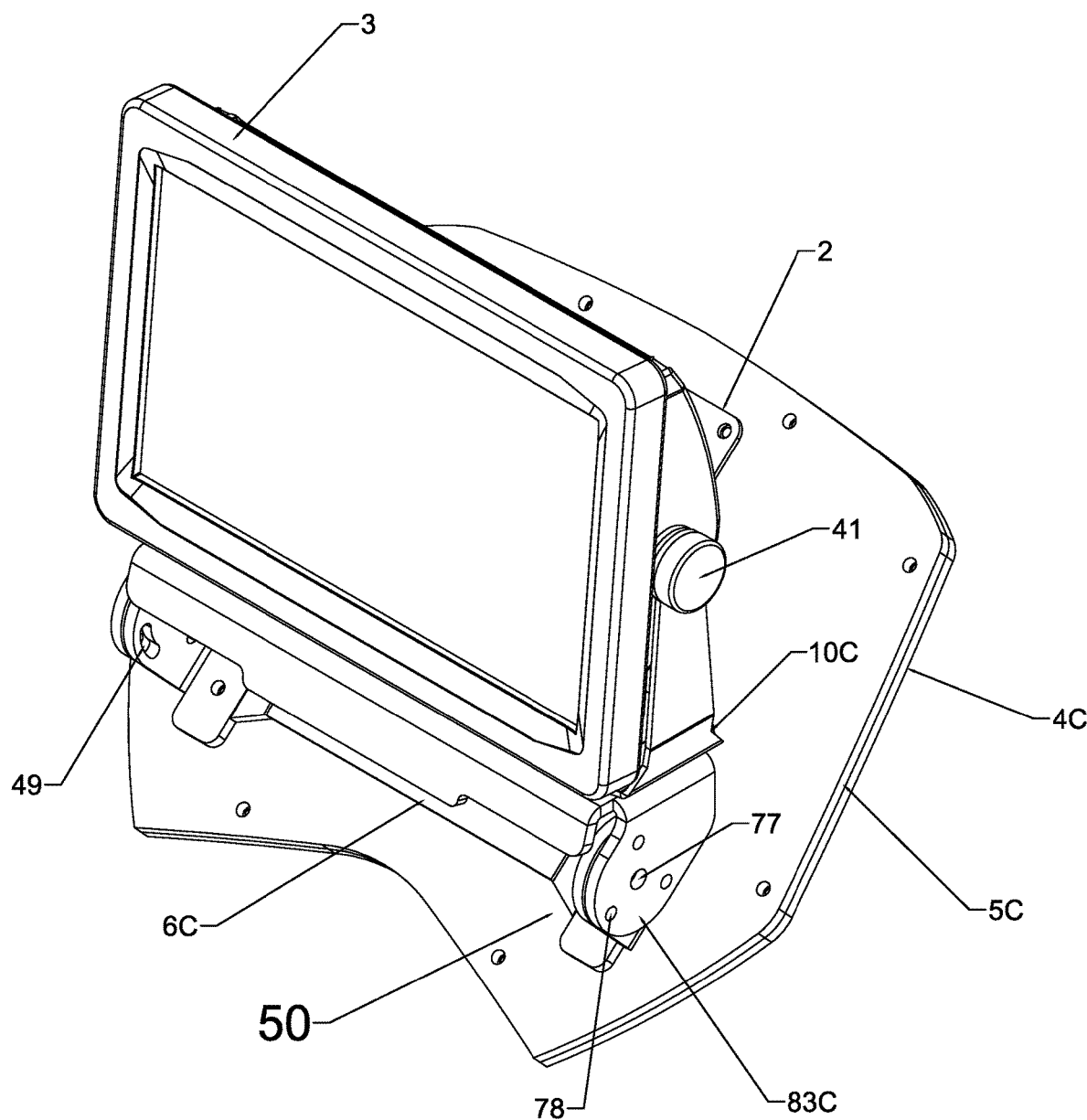
FIG. 6D is a top right perspective view of the console mount of FIG. 6B.
Figure 7A:
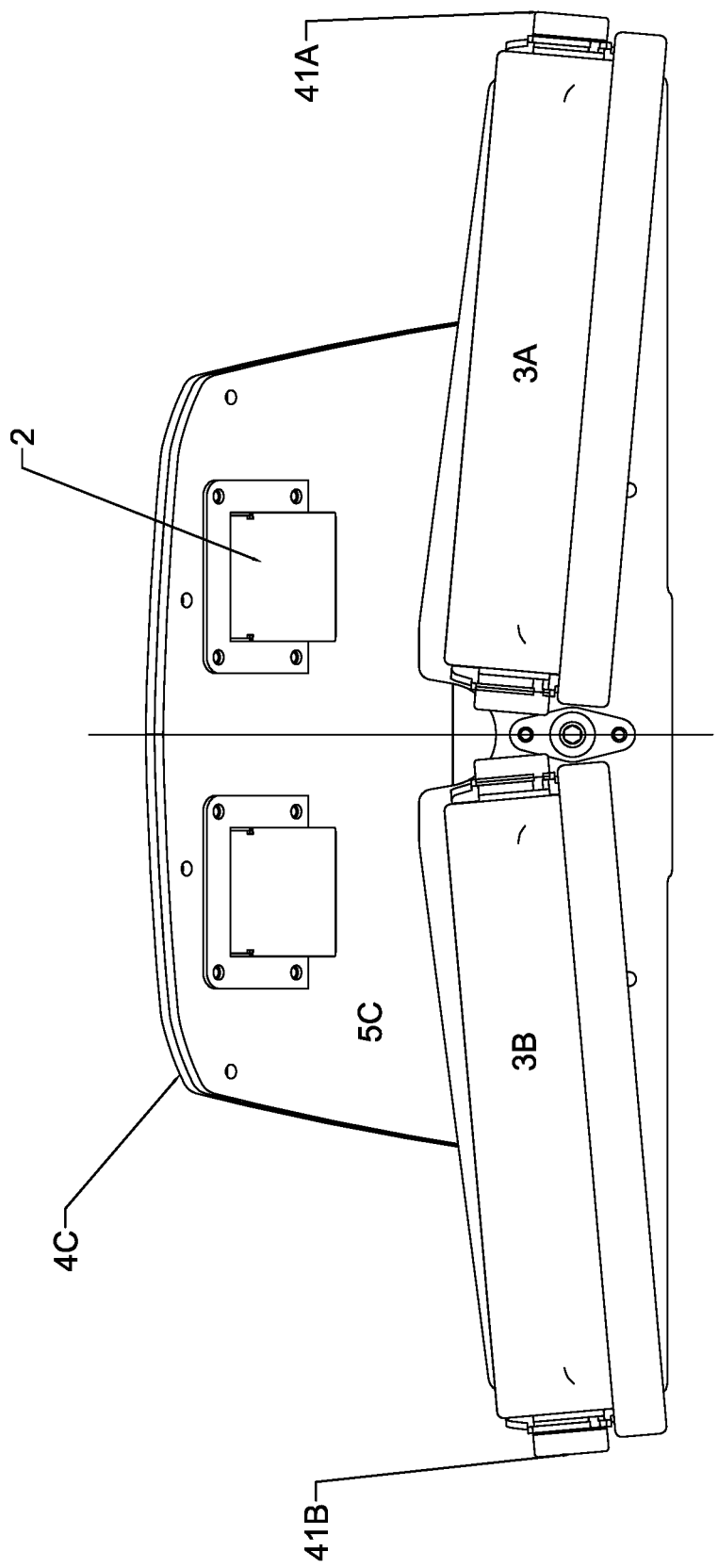
FIG. 7A is a top plan view of a double console mount with two electronic screens.
Figure 7B:
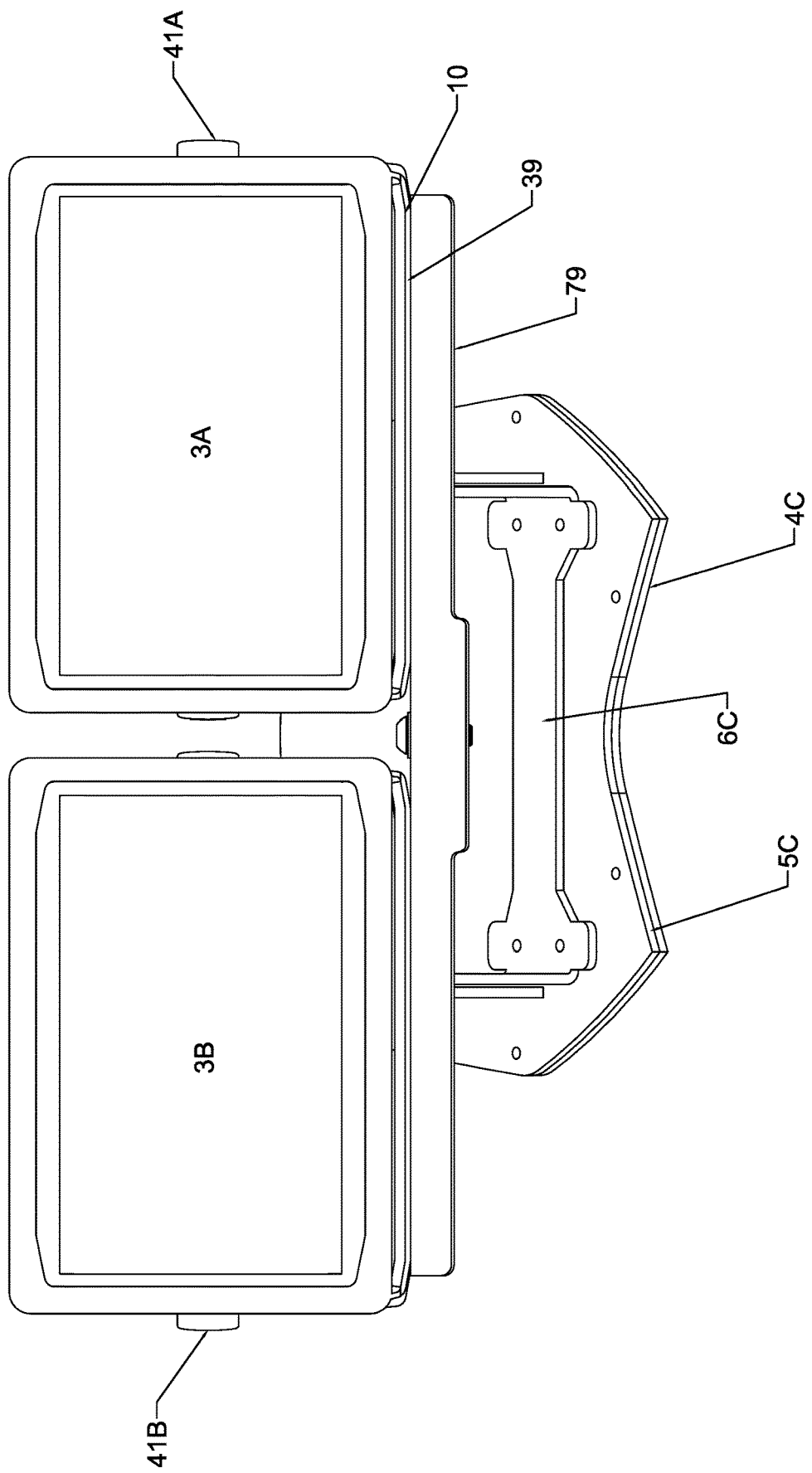
FIG. 7B is a front plan view of the double mount of FIG. 7A.
Figure 7C:
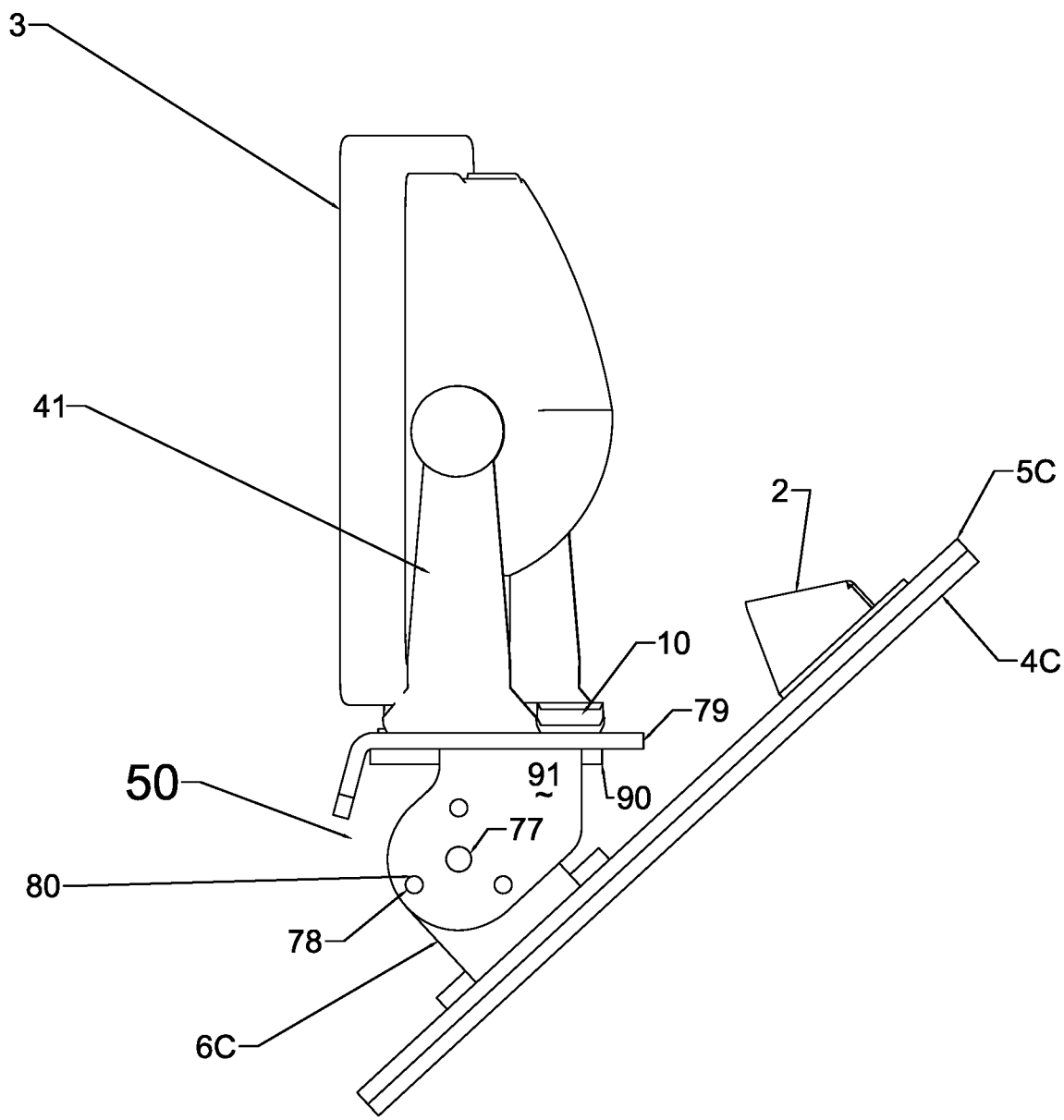
FIG. 7C is a right side plan view of the double mount of FIG. 7A.
Figure 7D:
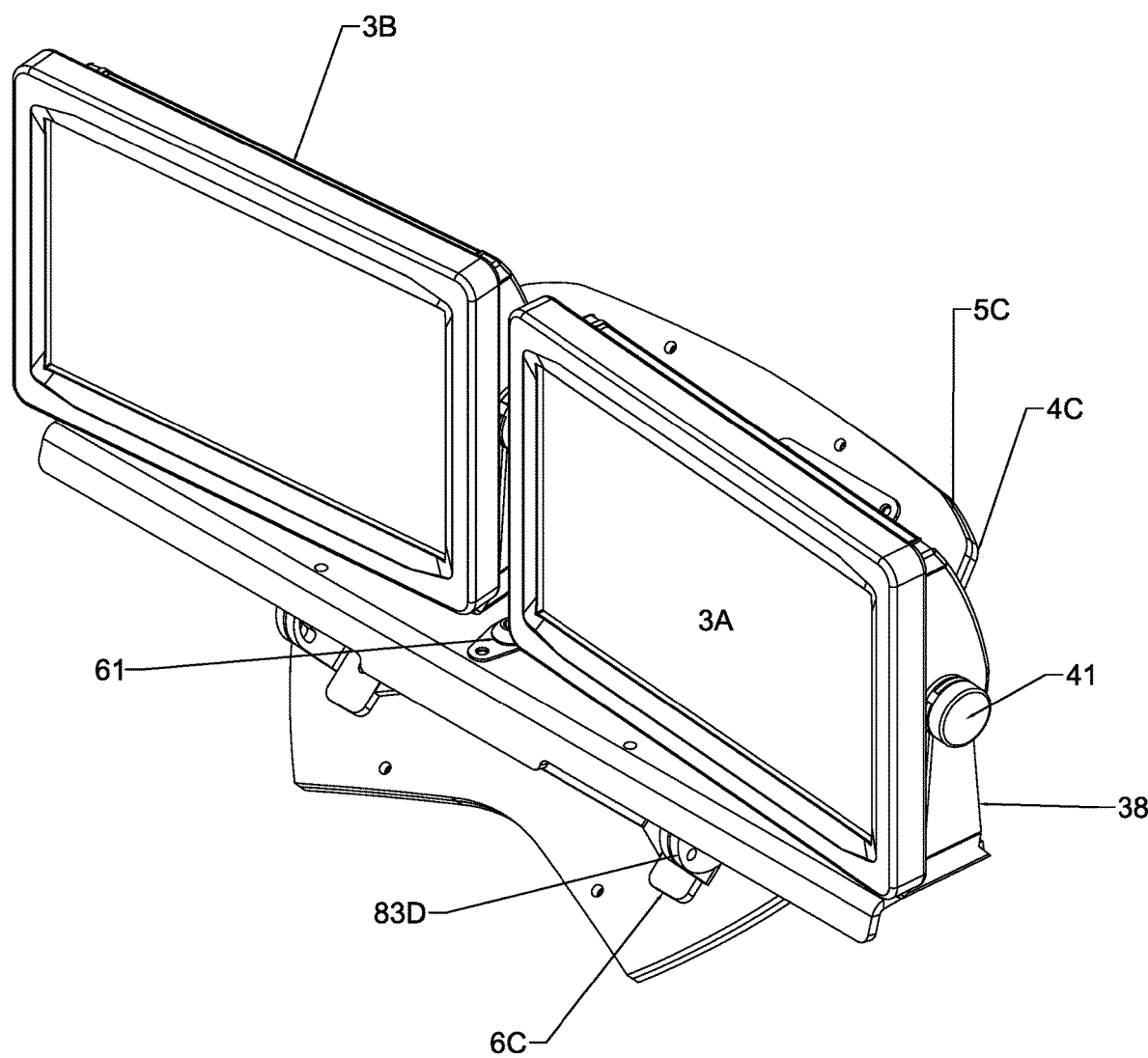
FIG. 7D is a top right perspective view of the double mount of FIG. 7A.
Figure 11A:
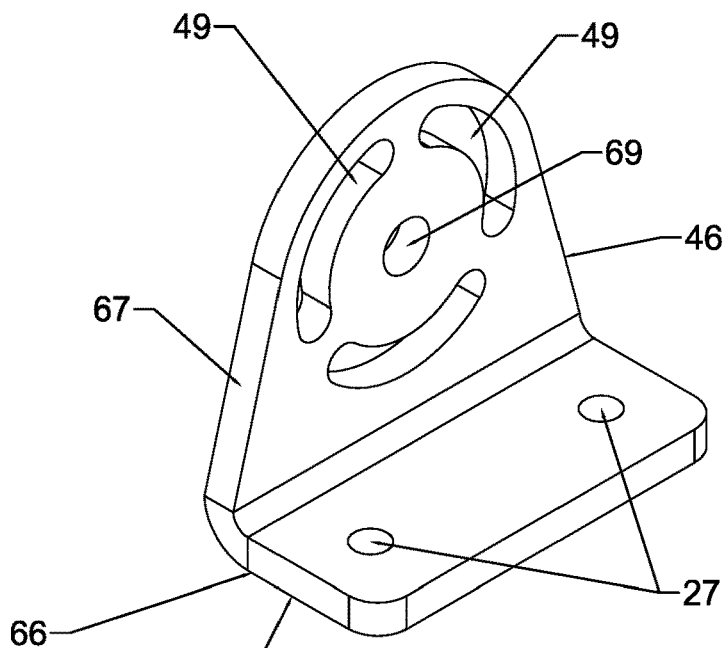
FIG. 11A is a perspective view of a base bracket as illustrated in FIG. 1D.
Figure 11B:
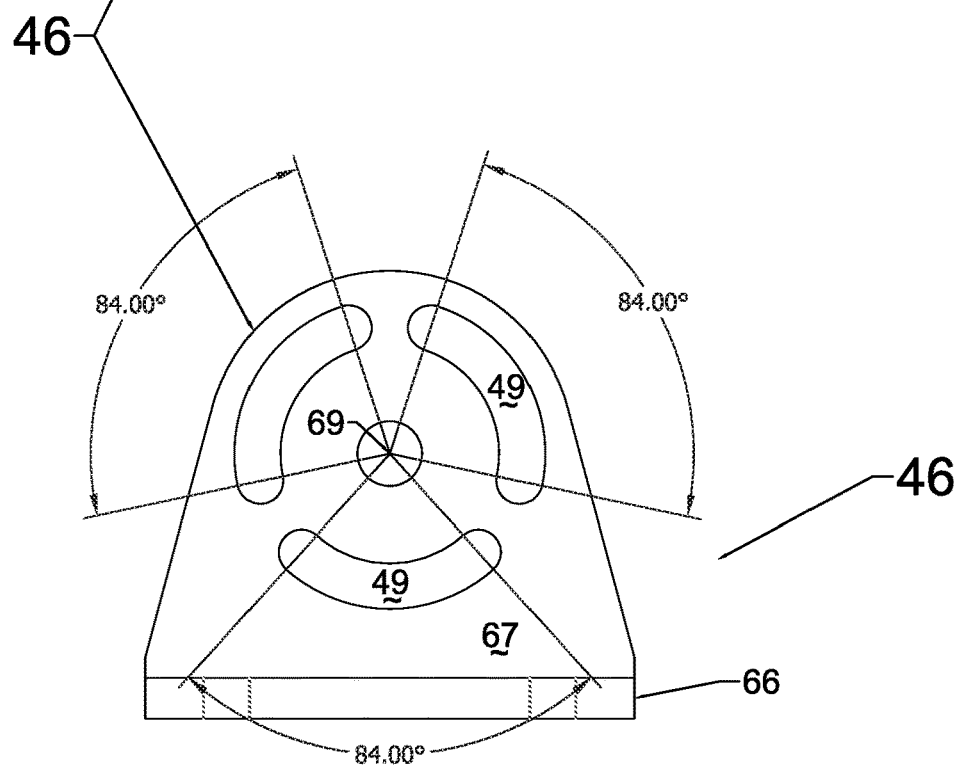
FIG. 11B is a right side plan view of the base bracket of FIG. 11A.

FIG. 4C demonstrates in detail the upper and lower securely fixable adjusting features 50,51. The upper adjusting feature 50 operates between the top mounting bar 43 and the connecting arm 47 with a central bolt 14 and Nyloc nut 18 and three peripheral bolts 40 with Nyloc nuts 12. The peripheral nut and bolt assemblies fit through openings 78 in the upper end 47a of connecting arm 47 and arcuate slots 49 in the upright semicircular face 67 of base bracket 46 and permit rotation through an arc of preferably about 60 to 100 degrees. Similarly, the lower adjustment feature 51 between the connecting arm 47 and base bracket 46 has a center bolt 14 and Nyloc nut 18 and three peripheral bolts 40 and with nuts 12. A rear view is shown in FIGS. 4B and C. The side view of FIG. 4D shows the heads of bolts 14,10 and the perspective view of FIG. 4E shows arcuate slots 49 on the rear of base bracket 46. These features can be seen in more explicit detail when this component is illustrated in isolation in FIG. 11, the top mounting bar is illustrated in isolation in FIG. 12, and the connecting arm shown in isolation in FIG. 13. Similarly, as shown in FIGS. 4D and 5, bolts 13 pass through the gimbal top plates 42 and the bases 39a,39b of gimbal brackets 41 and the upright gimbal fastening section 8 of top mounting bar 43. Bolts 15 and nuts 16 secure the sides 38a,38b of gimbal bracket arms 41 to the gimbal side support 45.

FIG. 5 is an exploded perspective view of the assembly of FIGS. 4A through 4E. The exploded illustration shows plastic washers 57 are placed between the connecting arm 47 and the base bracket 46 and top mounting bar 43 to facilitate movement when the nut and bolt assemblies are loosened. This washer 57 in FIG. 4C is more readily seen in the exploded view of FIG. 5. When operating the adjusting features 50, 51 it is preferable to use arcuate slots 49 because movement is allowed when the nuts 18, 12 are loosened without requiring the entire removal of the bolts 14, 40. In this fashion, no parts need be separated from the mounting system to accomplish an adjustment. The aspect of adjustability minimizes the opportunity for removing and losing parts, which could be difficult to address during the operation of a boat or other vehicle.

The securely fixable adjusting features 50,51 provide exceptional strength as the lateral forces of the nuts clamping the surfaces together generates a stable friction fit and the frictional force required to move tightly fastened connecting arm and bracket pieces runs to the hundreds of pounds. When the structural components such as base brackets 46, connecting arms 47, and top mounting bar 43 are fabricated from quarter inch thick powder coated aluminum, the adjusting features can withstand approximately 400 foot pounds of force without joint failure, instead the aluminum begins to deform. When utilized in tandem with left and right lower adjusting features and left and right upper adjusting features as illustrated in the embodiments, this represents at least 800 foot pounds of force before failure, far in excess of the demands placed upon the mount when carrying a 20 pound electronics load. The use of left and right adjusting features also serves to create a rectangular structure with the base and mounting bracket that provides structural reinforcement and further enhances the integrity of the mounting system.

The exploded view of FIG. 5 shows the exemplary positioning of additional stainless steel washers 9,11 and bolts 13,15 and 10 and washers 17, nuts 16,12 all in a largely conventional fashion.

Powder coated aluminum formed from quarter-inch plate is a preferred material due to its strength, weight, cost, and resistance to corrosion. Other materials such as titanium alloy, stainless steel, ceramics, and composite materials may be adapted for use in a fixably securable adjustable mount with appropriate modification. For instance, welding, permanent bonding, or unitary fabrication might be preferred methods with some alternative materials.

The console assemblies are addressed somewhat different requirements as the mounting flange 4C in FIGS. 6A through 6D is typically placed on an inclined console surface with faceplate 5C and a face top bar 6C that connects by a similar adjustment feature to a main top mounting bar 8C. Again, the gimbal bracket 41 is sandwiched between a gimbal top plate 10C and the top mounting bar 8C, though in the single screen console structure of FIGS. 6A-6D, the sides of the gimbal bracket are not provided with additional reinforcement. The base top bar 6C combines the function of the two separate L-shaped base brackets 46 from the bow mount designs discussed in FIGS. 1-5. As shown in FIGS. 21A-21D, the base top bar 6C has upstanding semicircular plates 67a,67b on its right and left ends that have the same arcuate slot 49 and center opening 69 as the upstanding semicircular plate 67 of the L-shaped brackets 46 shown in FIGS. 11A-11D. This illustrates the variety of ways in which the generally planar upstanding surface with openings for bolts in the center and arcuate slots can be attached to the faceplate 5C for use in the fixable adjustment mechanism. Also, while screw fastening is used in the illustrated embodiments, however there is no reason that the operative elements cannot be welded or permanently bonded to, or unitarily formed with, the faceplate if appropriate materials are used.

Figure 23A:
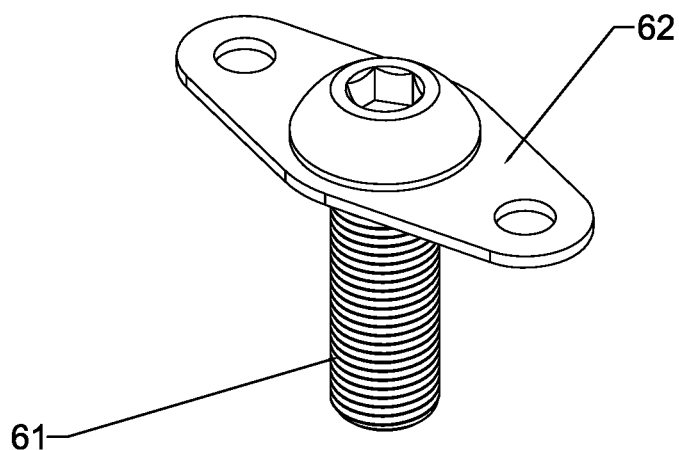
FIG. 23A is a perspective view of the bolt-knob assembly with socket cap screw and spoon components.
Figure 23B:
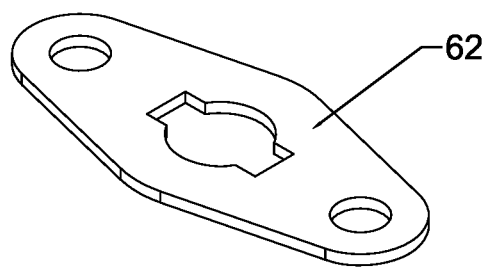
FIG. 23B is perspective view of the spoon of FIG. 23A.

The console mount is also provided in a double assembly design as reflected in FIGS. 7A through 7D. In the dual screen configuration, the same mounting flange 4C and faceplate 5C can be utilized though the faceplate will have different openings 29 for two sets of wires as reflected in FIG. 7A with two weather covers. The mounting flange 4C will typically be secured around an opening in the console of the boat or vehicle, and bolts are passed through the flange and vehicle console structure with nuts securing the bolts in place. The single console faceplate 5C is shown in isolation in FIGS. 17A-17B and the dual console faceplate is shown in FIGS. 18A-18B. A series of six apertures 25 allows the base bracket 6C to be mounted at different heights along the inclined faceplate 5C. The base bracket 6C has an adjustment feature structure 67a,67b where it connects to the end flaps 91 of the top bar mount 8D. An additional top cross bar 79 is placed on the top bar mount 8D, as shown in isolation in FIGS. 22A-22D. The top cross bar 79 has apertures that permit the fastening of the gimbal top plates 10C on the bases of gimbal brackets 41 at a variety of angles around the center axis of the top cross bar 79 to permit a preferred horizontal rotational orientation of the screen in the gimbal bracket 41. Along the center axis of top cross bar 79 is an opening to receive a bolt-knob assembly, shown in FIG. 23 consisting of a hex bolt 61 and spoon 62. This feature is provided to allow the top cross bar to be removed from the top bar mount 8 with screens 3 attached, so that by only removing a single bolt 61 the electronics can be easily removed from the boat and stored safely when not in use.

Figure 8:
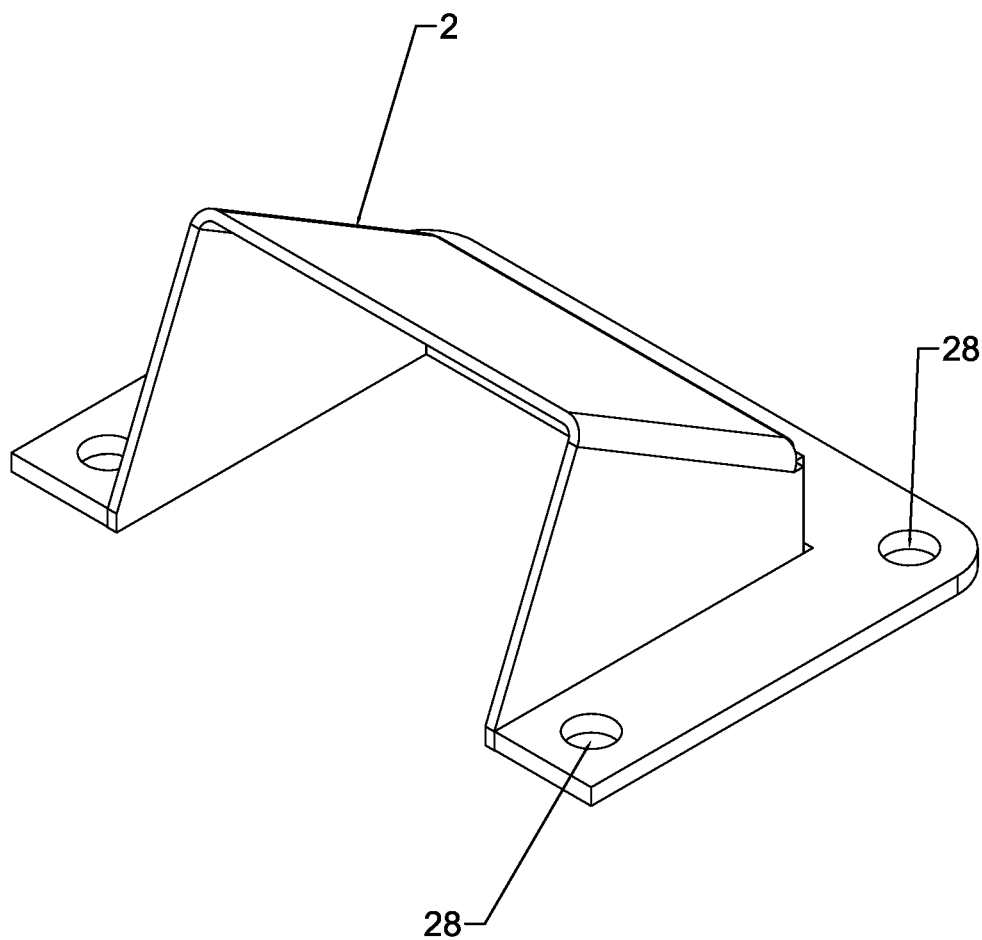
FIG. 8 is a top right perspective view of the weather cover shown in FIG. 1D.
Figure 9A:
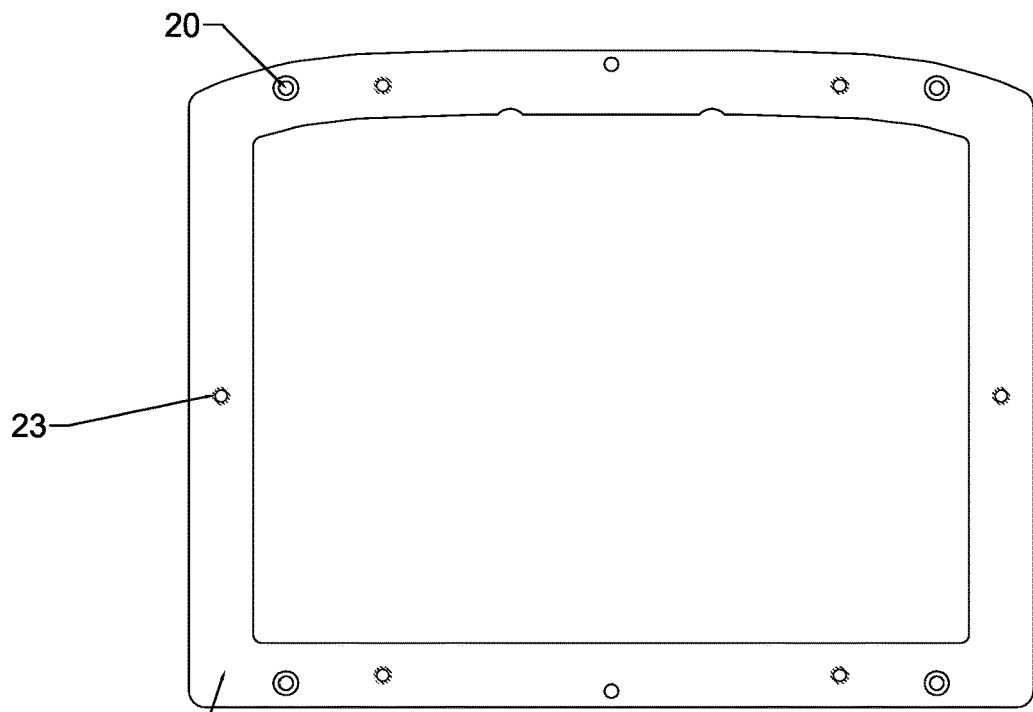
FIG. 9A is a top plan view of a bow mounting flange.
Figure 9B:
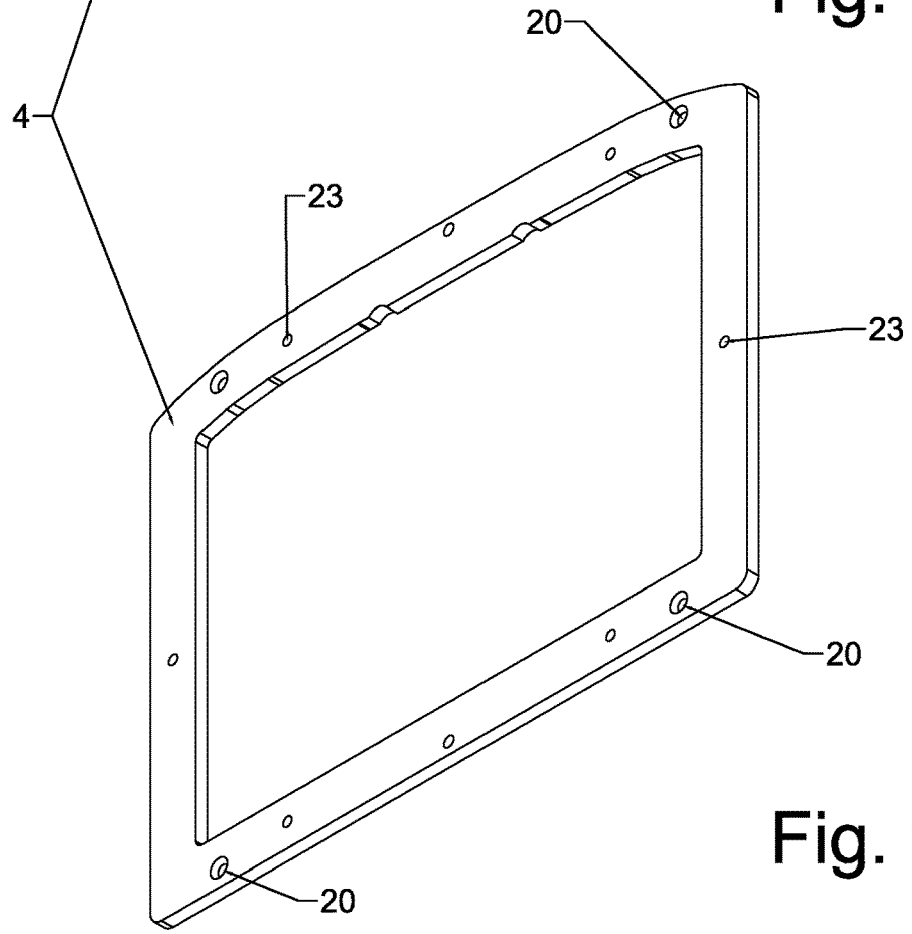
FIG. 9B is a perspective view of the mounting flange of FIG. 9A.
Figure 10A:
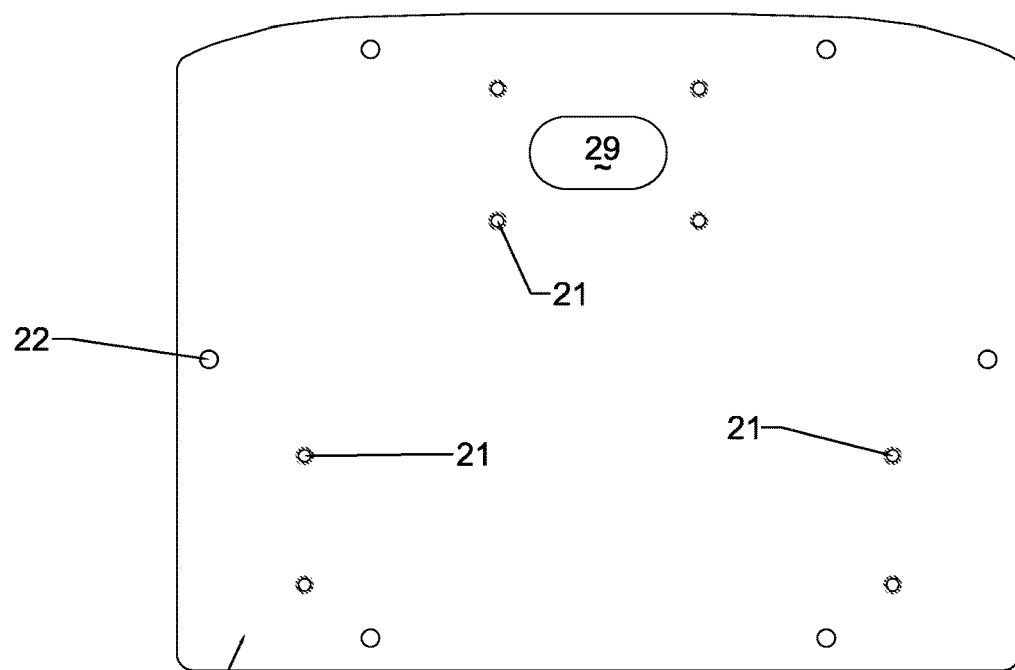
FIG. 10A is a top plan view of a bow faceplate for attachment to the flange of FIG. 9A.
Figure 10B:
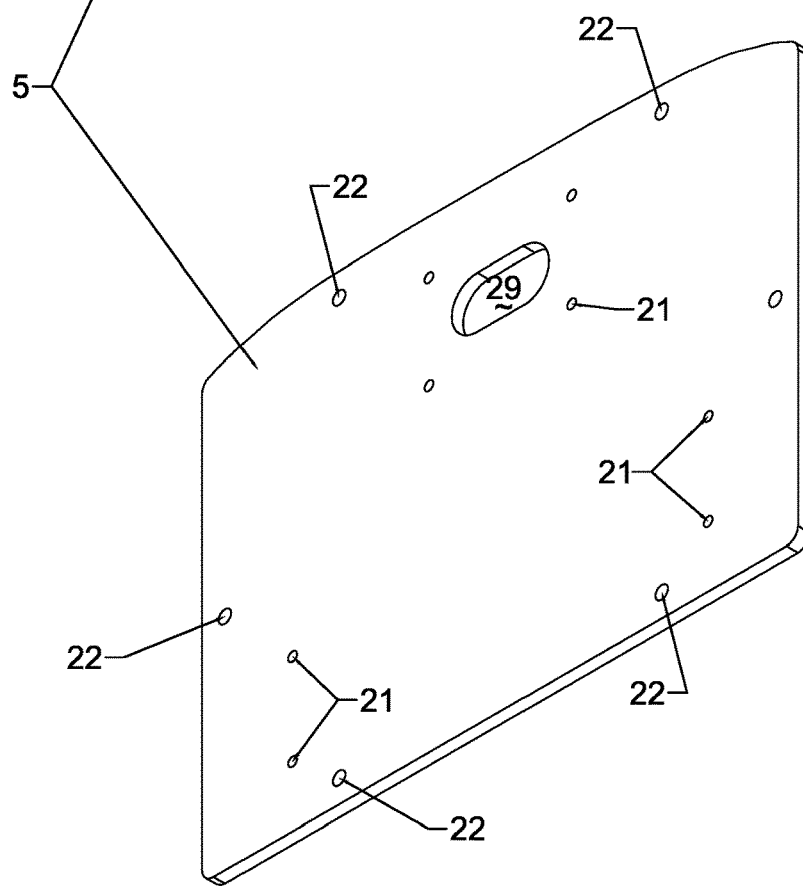
FIG. 10B is a perspective view of the faceplate of FIG. 10A.

FIG. 8 illustrates an exemplary weather cover in isolation with openings 28 to permit the cover to be fastened to faceplate 5,5C. Threaded openings 21 in faceplate 5 as shown in FIG. 10A opening 29 are the typical location for positioning a weather cover. Weather cover 2 is also useful as wiring from the generic electric display 3 will need to pass to the interior of the console.

In the L-shaped base bracket 46 of the dual bow mount embodiment B it can be seen that the base portion 66 of the bracket 46 has openings 27 to facilitate fastening to a faceplate 5. The base adjusting bracket 46 also has an upstanding portion 67 that is preferably generally nearly perpendicular to the faceplate and includes three arcuate slots 49 surrounding a center aperture 69. Optimally, 0.25 inch diameter bolts are connecting through the slots 69 with a similar adjusting face on a second planar surface. A larger bolt, such as a 0.375 inch diameter bolt, may be appropriate for the center aperture.

Figure 12A:
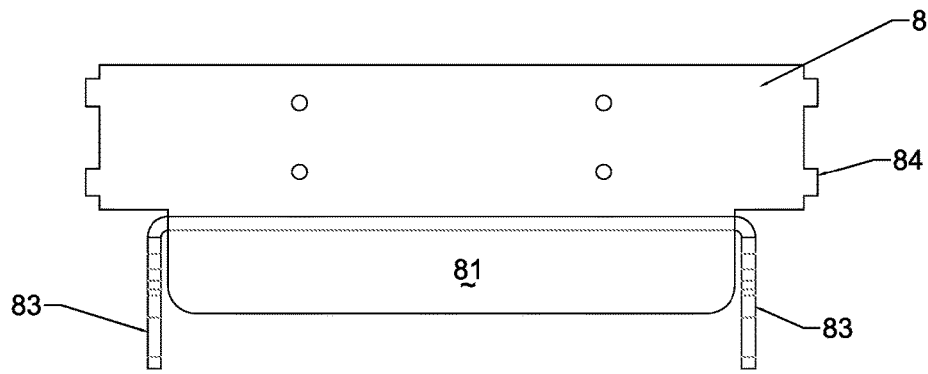
FIG. 12A is a front plan view of a top mounting bar as shown in double bow assembly of FIG. 1D.
Figure 12C:
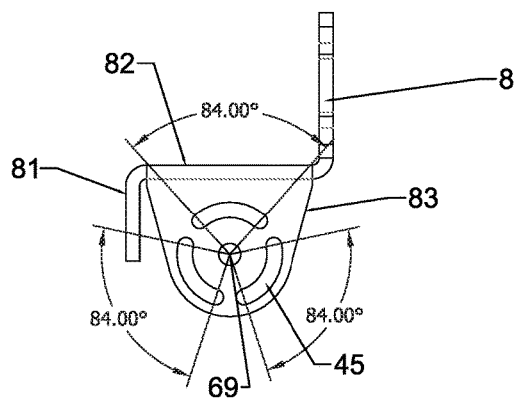
FIG. 12C is a right side plan view of the top mounting bar of FIG. 12A.
Figure 12B:
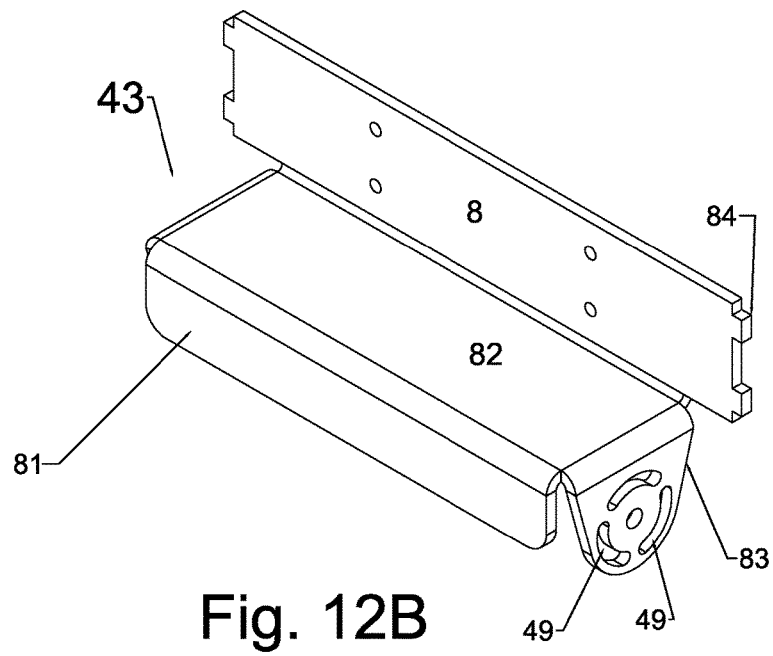
FIG. 12B is a perspective view of the top mounting bar of FIG. 12A.
Figure 13A:
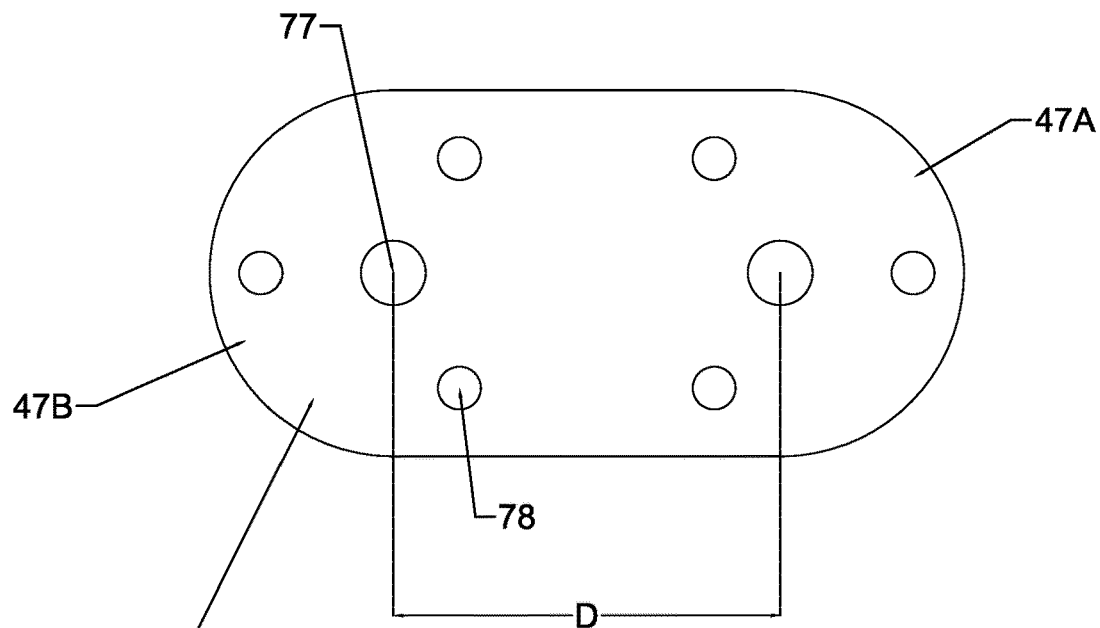
FIG. 13A is a top plan view of a connecting arm as shown in FIG. 1D.
Figure 13B:
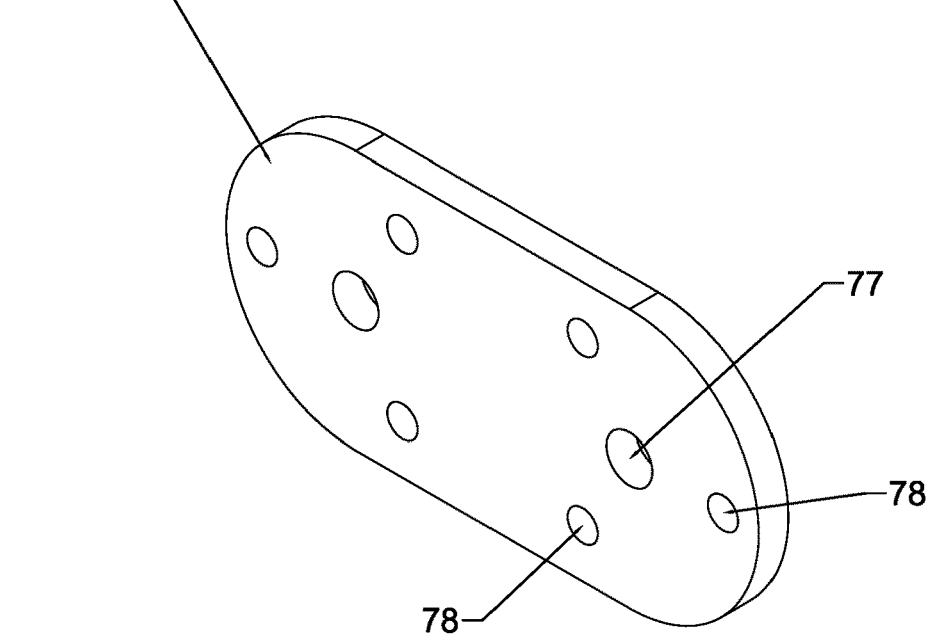
FIG. 13B is a perspective view of the connecting arm of FIG. 13A.

A similar connecting structure is found in the top mounting bar 43 depicted in FIGS. 12A-12C. The top mounting bar 43 forms a dog leg shape with vertical sections 81 and 8 spaced apart by horizontal surface 82. On either side of surface 82 are downwardly extending flaps 83 that contain the three arcuate slots 49 surrounding a central opening 69 suitable for adjoining to structure such as the upright portions 67 of the L-shaped brackets 46 or the ends 47a,47b of connecting arms 7 depicted in FIGS. 13A and B. In the connection arms 7 the distance d between the central openings 77 for upper adjusting feature and lower adjusting feature need not be more than an inch or two to provide sufficient clearance for the adjusting mechanism components. Greater length in the connecting arm provides for greater forward and rearward displacement of the mounted electronics but also places additional stress on the mounting system. It will also be understood that the openings in the ends 47a,47b of connecting arm 7 could be swapped with the arcuate slots 49 of the upright ends 67 of base brackets 46 with no change in function. If both the end 47b of connecting arm 7 and base bracket end 67 have slots the rotational angle adjustment could be substantially increased to provide 180 degrees of rotation, but slightly less strength.

Figure 14A:
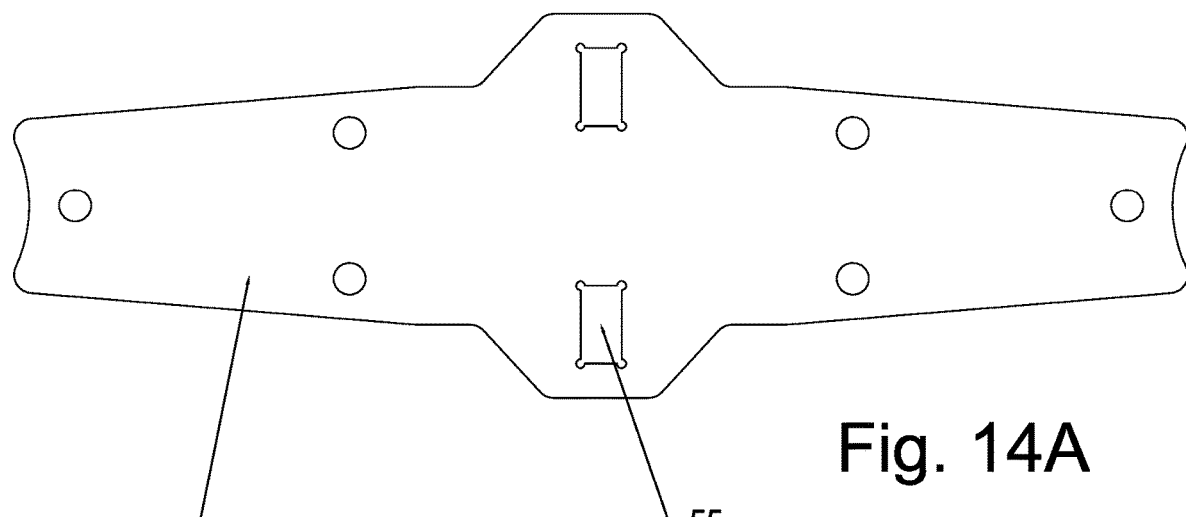
FIG. 14A is a top plan view of a gimbal side support as shown in FIG. 1D.
Figure 14B:
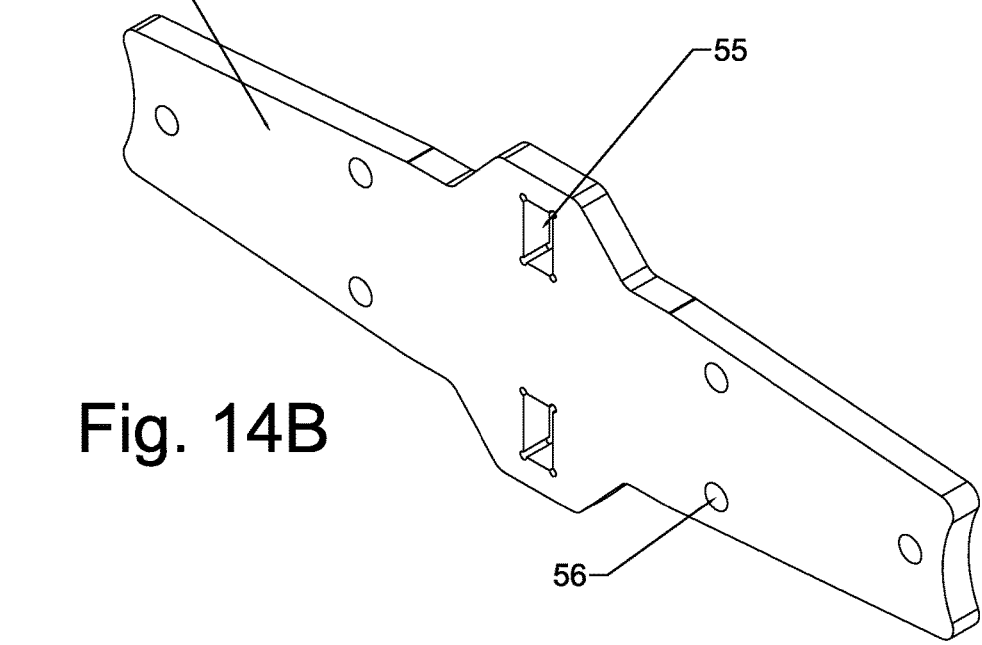
FIG. 14B is a perspective view of the gimbal side support of FIG. 14A.

FIGS. 14A and 14B depict a gimbal side support utilized in the dual console bow mount and with openings 55 to be received on pegs 84 at the ends of the upstanding member 8 of the top mounting bar of 43 shown in FIGS. 12A-12C. In addition, openings 56 permit passage of bolts 15 through the support 45 and there fastening of the gimbal arms 38.

Figure 15A:
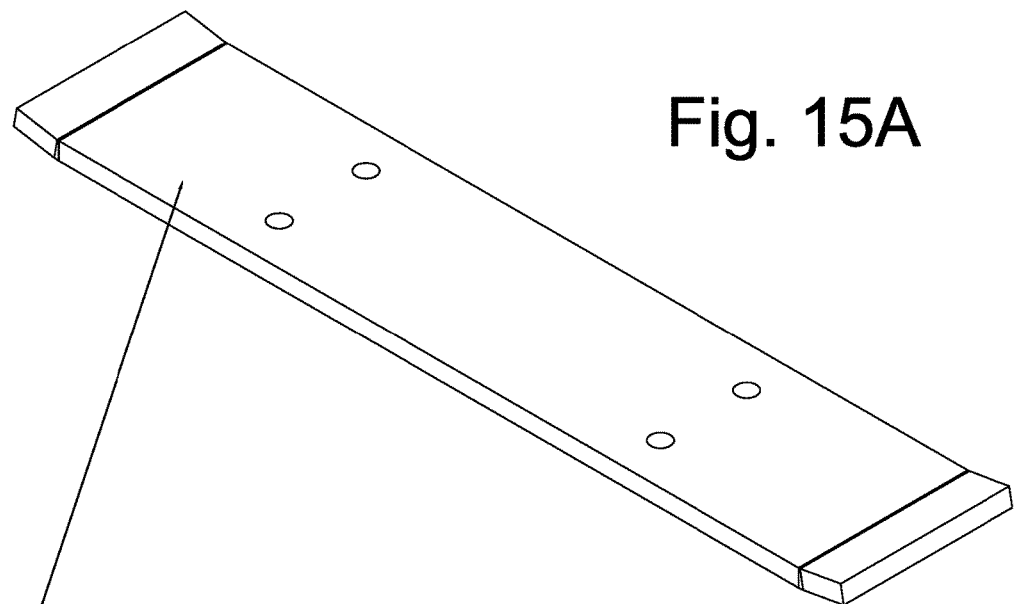
FIG. 15A is a perspective view of a gimbal top plate as shown in FIG. 1E.
Figure 15B:
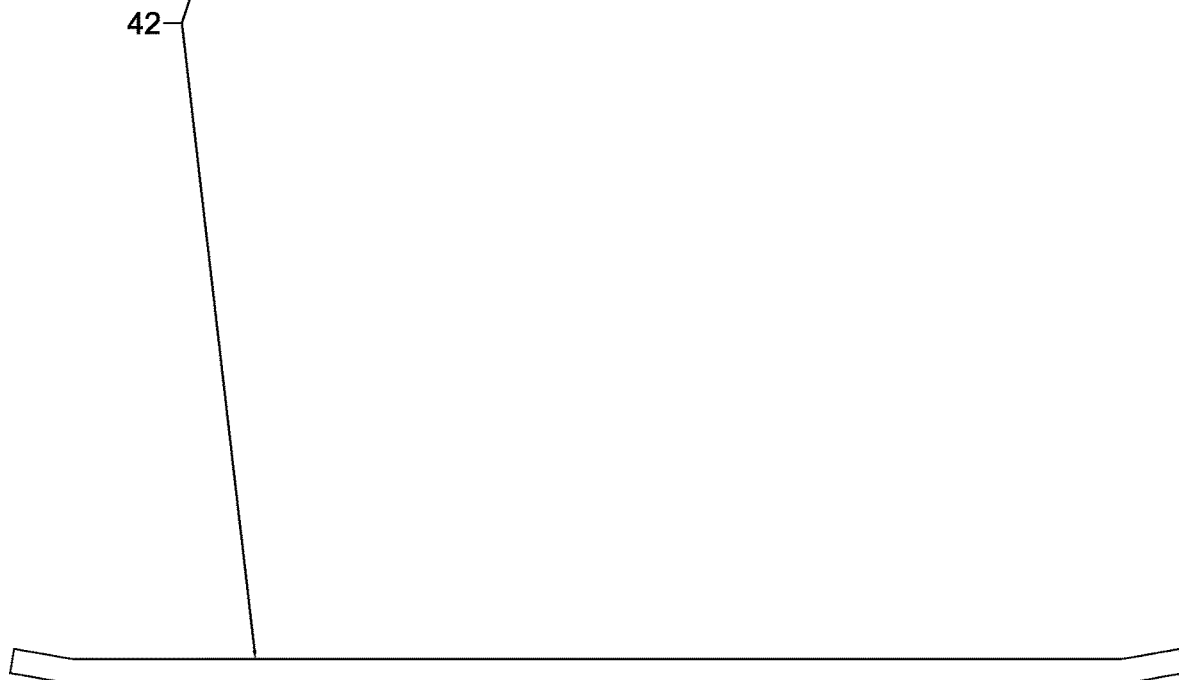
FIG. 15B is a side plan view of the gimbal top plate of FIG. 15A.

FIG. 15B depicts a gimbal plate 42 that is adapted to sandwich a gimbal base 39 between itself and another structural member to support the gimbal.

Figure 16A:
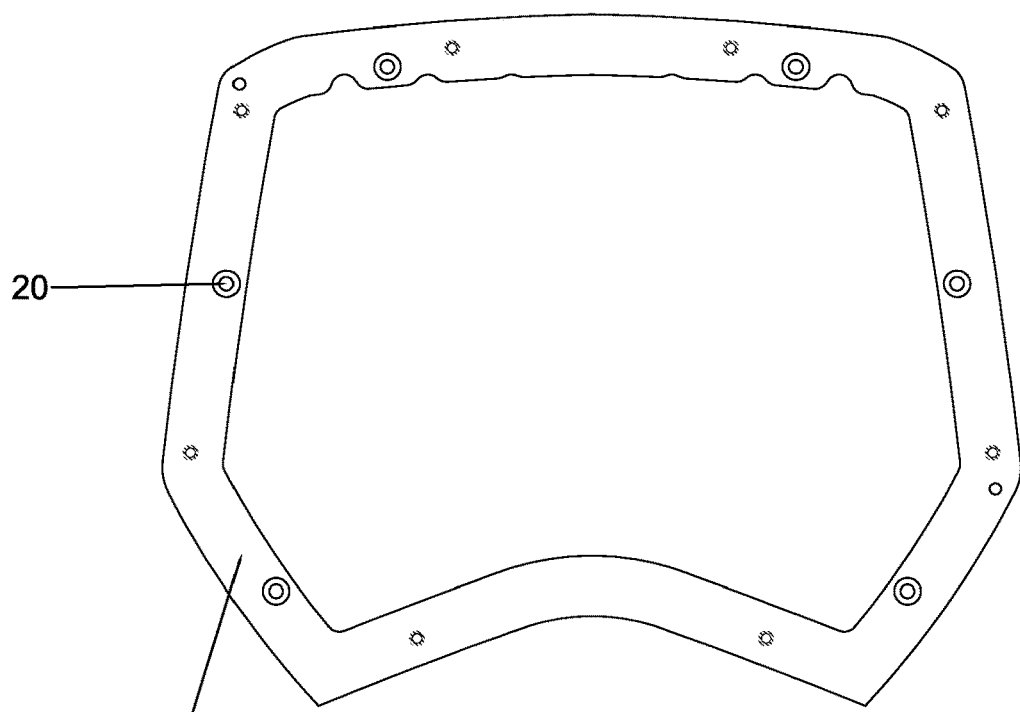
FIG. 16A is a top plan view of a console mounting flange as shown in FIG. 6C.
Figure 16B:
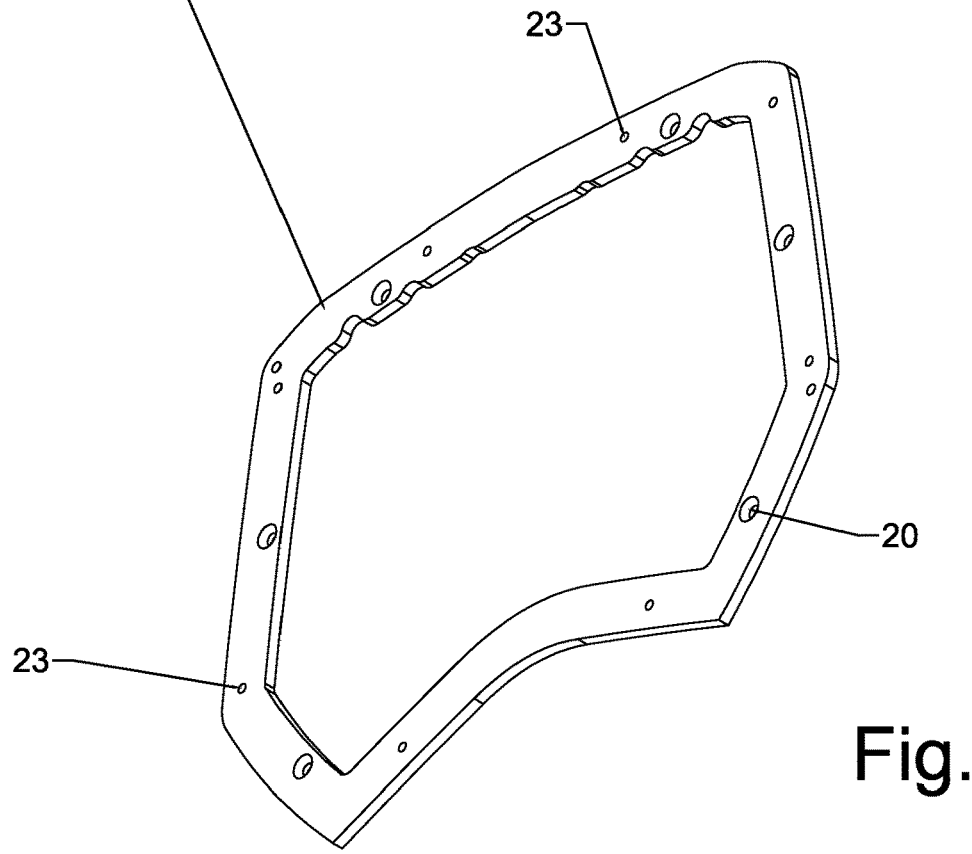
FIG. 16B is a perspective view of the mounting flange of FIG. 16A.

FIGS. 16 A and 16B illustrate a console mounting flange 4C with countersunk openings 20 to permit the flange to be mounted to a vehicle console and threaded openings 23 to permit a faceplate to be secured to the flange.

Figure 17A:
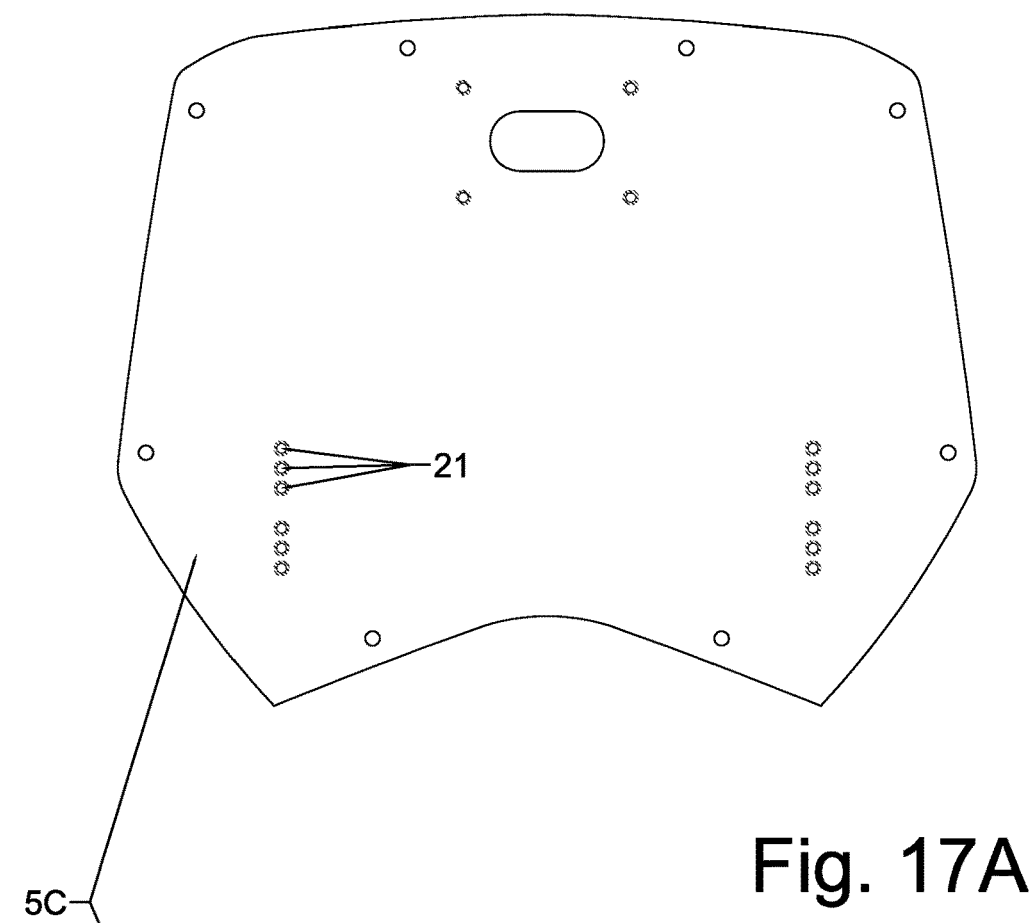
FIG. 17A is a top plan view of a single console faceplate as shown in FIG. 6B.
Figure 17B:
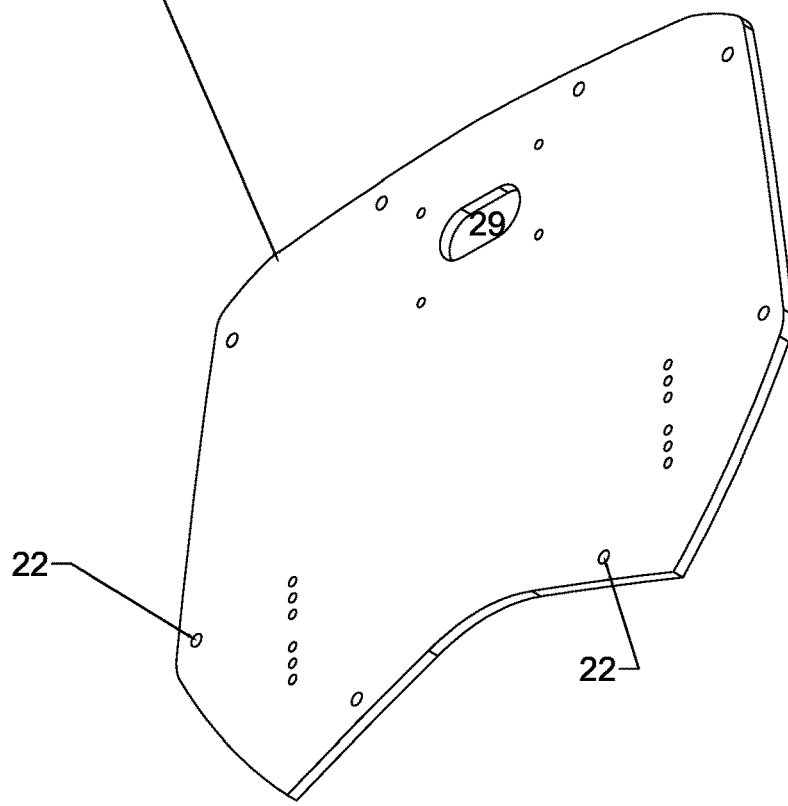
FIG. 17B is a perspective view of the faceplate of FIG. 17A.
Figure 18A:
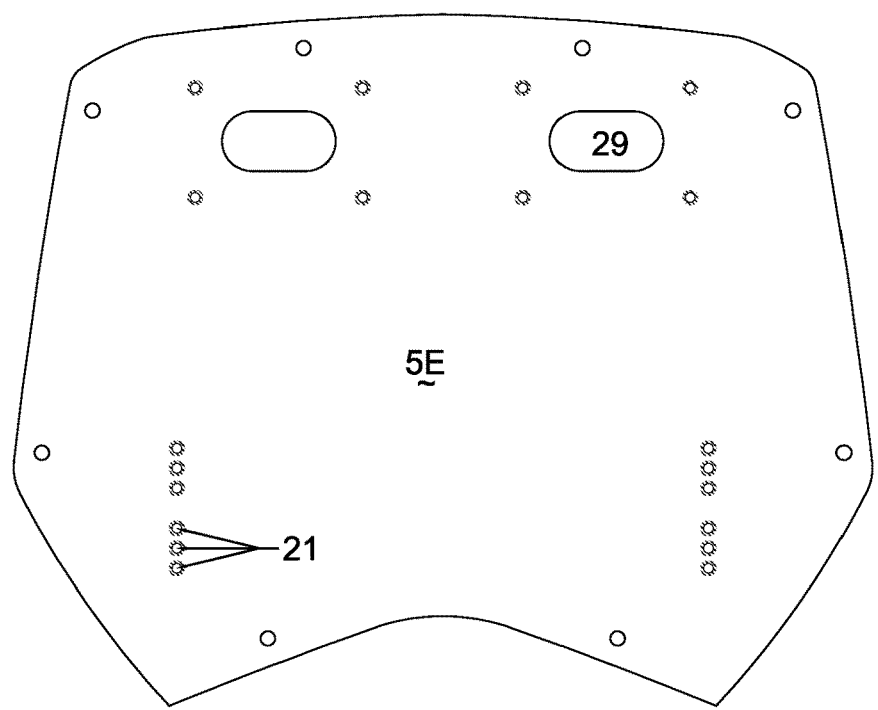
FIG. 18A is a top plan view of a double console faceplate as shown in FIG. 7B.
Figure 18B:
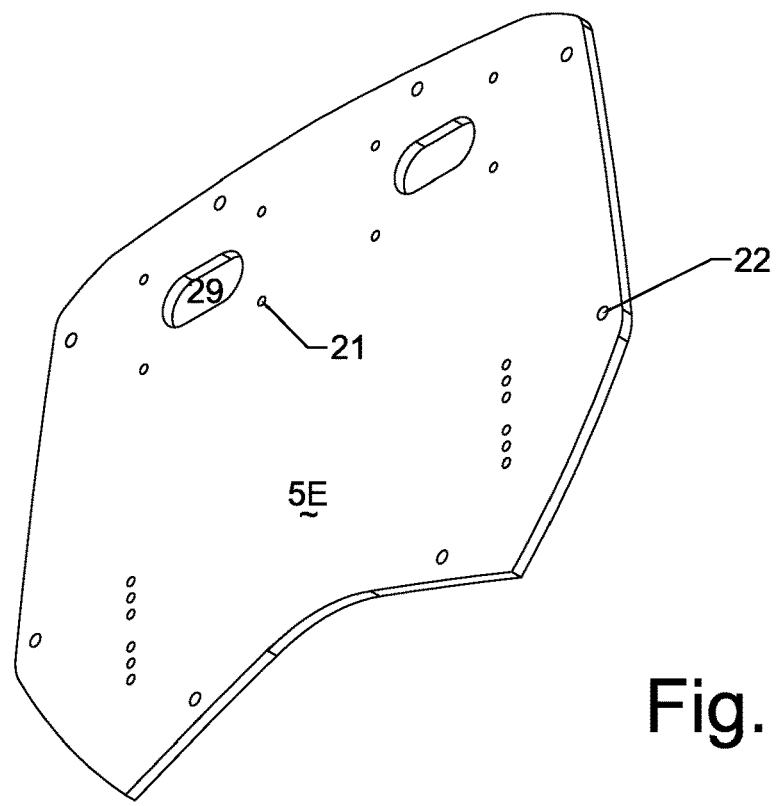
FIG. 18B is a perspective view of the faceplate of FIG. 18A.
Figure 19D:
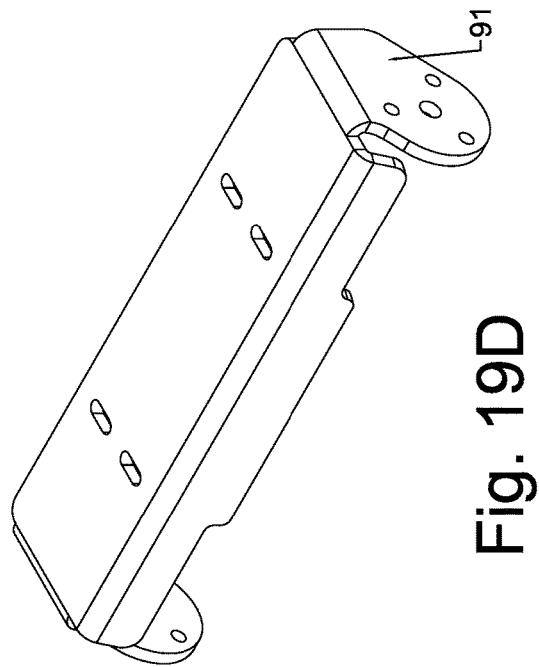
FIG. 19D is a perspective view of the console top mounting bar shown in FIG. 19A.
Figure 19C:
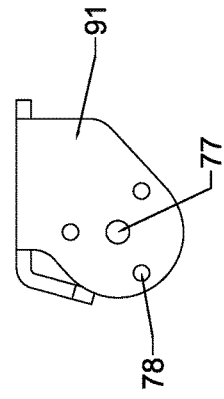
FIG. 19C is a right side plan view of the console top mounting bar shown in FIG. 19A.
Figure 19A:
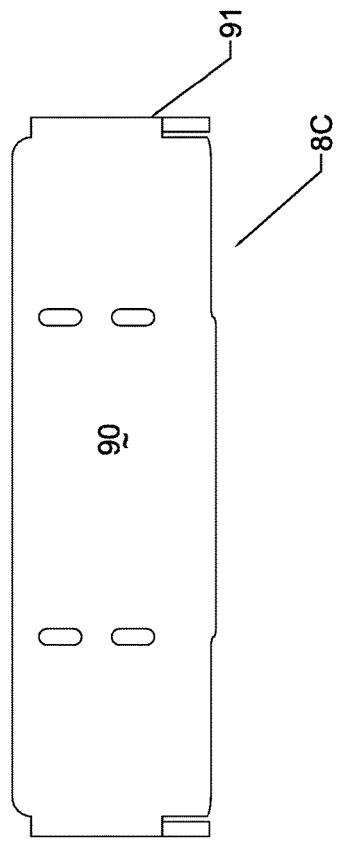
FIG. 19A is a top plan view of a console top mounting bar as shown in FIG. 6C.
Figure 19B:
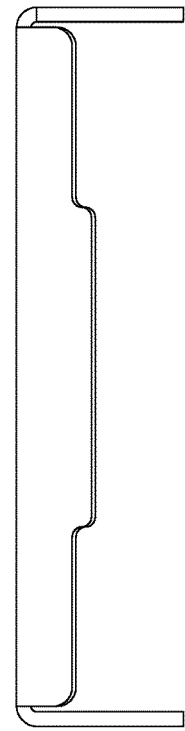
FIG. 19B is a front plan view of the console top mounting bar shown in FIG. 19A.
Figure 22A:
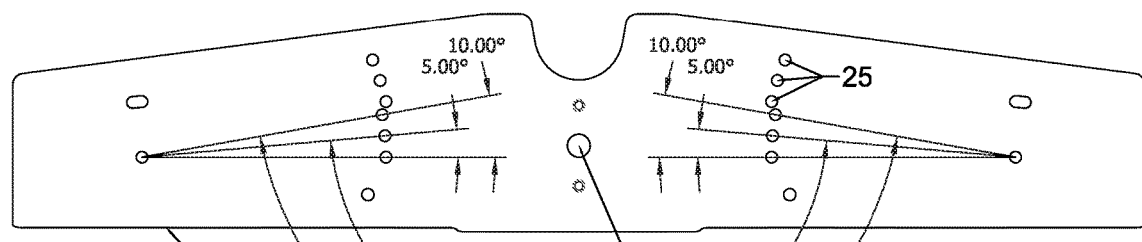
FIG. 22A is a top plan view of a console double top cross bar as shown in FIG. 7B.
Figure 22B:
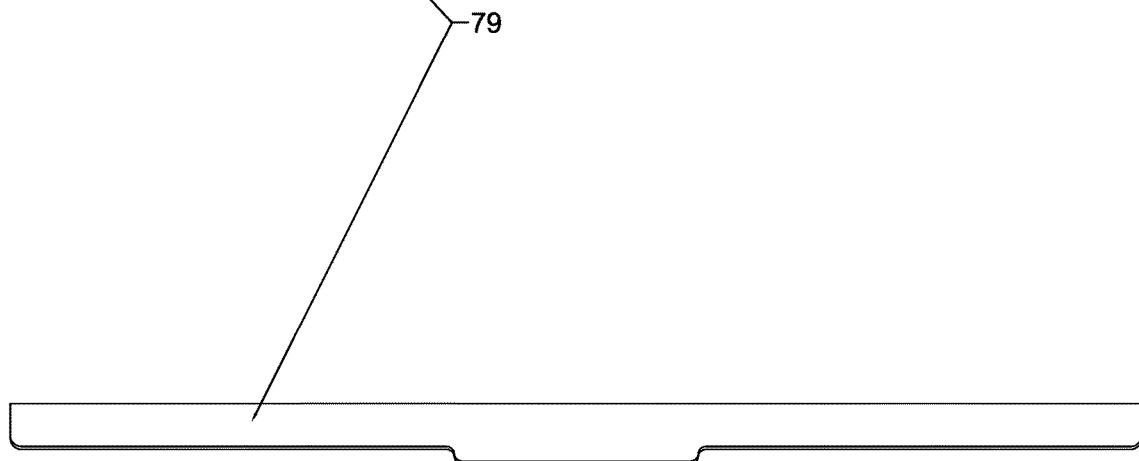
FIG. 22B is a front plan view of the console double top cross bar of FIG. 22A.
Figures 22C, 22D:
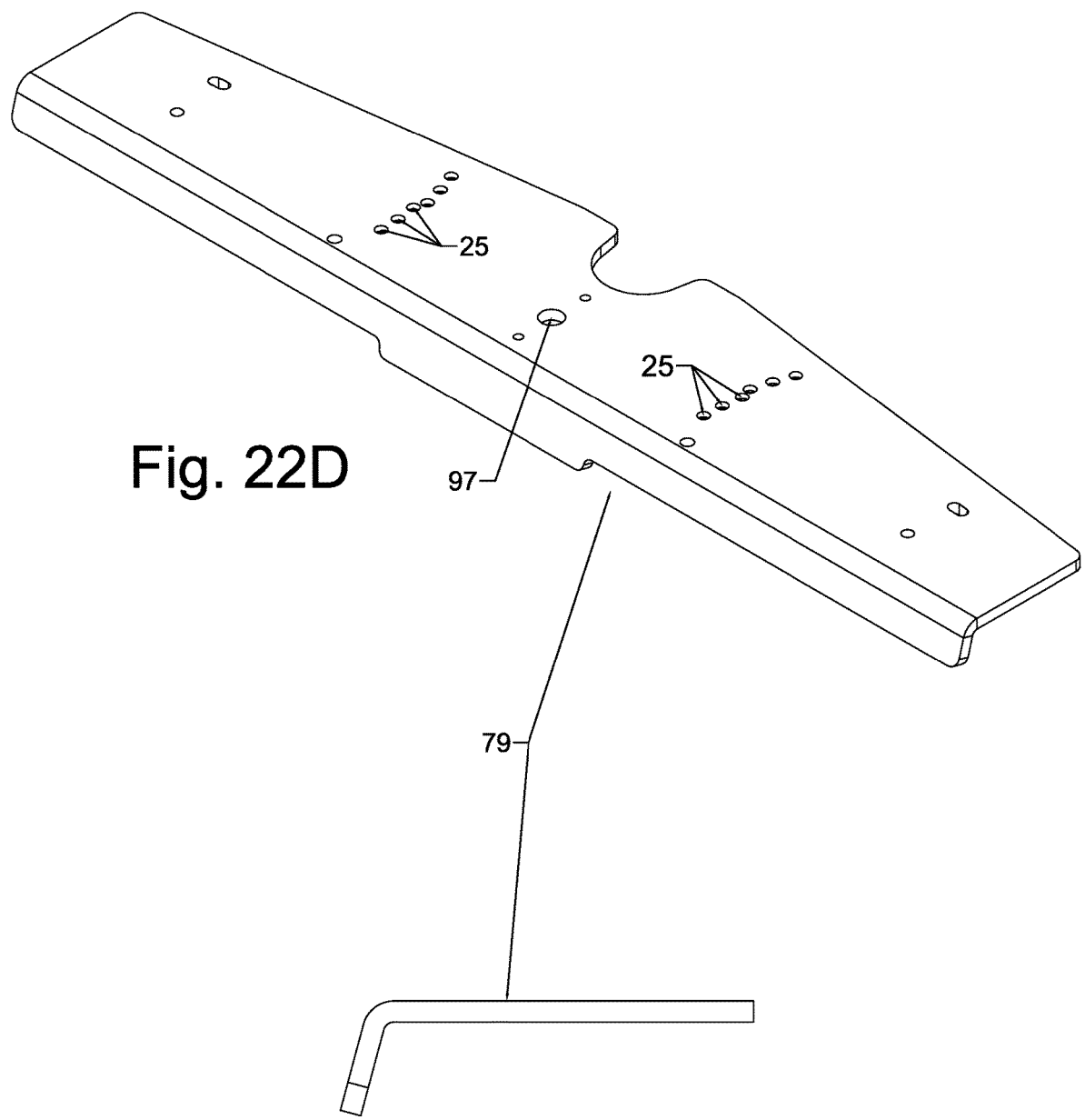
FIG. 22C is a side plan view of the console double top cross bar of FIG. 22A.
FIG. 22D is a perspective view of the console double top cross bar of FIG. 22A.

FIG. 17A and 17B illustrate a faceplate 5c adapted for use with the flange 4C of FIGS. 16A and B with openings 22 for fastening to the flange. The faceplate 5C of FIGS. 18A and 18B is similar but with two openings 29 surrounded by threaded apertures 21 to receive two weather covers 2 as this faceplate 5C is adopted for use with a dual mount assembly.

FIGS. 19A-19D and FIGS. 20A-20D each illustrate console top mounting bars, the depictions in FIGS. 19 being adapted for a single graph mount and the mounting bar of FIG. 20 being adapted for a dual mount but each having the same general structure with each of the mounting bars 8C,8D contains a generally top planar surface that separates two downwardly folding attachment surfaces 91 each having a central aperture 77 to receive a large bolt surrounded by three smaller apertures 78 adopted to received smaller bolts and to connect with slotted parallel planar surface to form an adjustment feature.

FIGS. 21A-D illustrate the base bracket 6C with two upwardly directed attachment plates 67a,67b each having a central opening 69 surrounded by three arcuate slots 49 for attachment to a similar plate, such as shown on the ends of connecting arm 7, as a part of an adjustment mechanism. Apertures in the connecting member between the upstanding adjustment assemblies 67a,67b have openings for screw attachments to a faceplate 5C or base.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed herein is:

1. A vehicular electronic mounting system to secure electronic apparatus having a gimbal bracket with a bottom and two sides comprising:
   spaced apart first and second parallel planar surfaces attached to a base and extending upward;
   spaced apart third and fourth parallel planar surfaces extending downward from a mounting bar;
   the first upward and third downwardly extending planar surfaces being rotationally connected;
   the second upward and fourth downwardly extending planar surfaces being rotationally connected;
   said first and third planar surfaces and said second and fourth planar surfaces being frictionally fixable with respect to each other; and
   a top plate is mounted over the gimbal bracket and secured to the mounting bar so that the bottom of the gimbal bracket is sandwiched between the top plate and mounting bar;
   wherein the base is a face plate secured to a mounting flange fixed about an opening in the vehicle structure.

2. A vehicular electronic mounting system having a first securely fixable rotatable joint comprising a first planar element with a central opening; a second planar element with a central opening; a fastener passing through the central openings of the first and second planar elements; wherein each of the first and second planar elements has a plurality of openings surrounding the central opening; and the plurality of openings on one of the planar elements are arcuate slots; and further comprising fasteners passing through the plurality of openings surrounding the central opening and frictionally fixing the planar surfaces in relation to each other; and
   having a second securely fixable rotatable joint comprising third planar element with a central opening; a fourth planar element with a central opening; a fastener passing through the central openings of the third and fourth planar elements; wherein each of the third and fourth planar elements has a plurality of openings surrounding the central opening; and the plurality of openings on one of the planar elements are arcuate slots; and further comprising fasteners passing through the plurality of openings surrounding the central opening and frictionally fixing the planar surfaces in relation to each other;
   wherein the first and third planar elements are parallel to one another and connected to a base, and the second and fourth planar elements are connected to a mounting structure for an electronic apparatus and
   wherein a top plate is mounted over and secures a gimbal bracket of the electronics apparatus downward against the mounting structure.

3. A vehicular electronic mounting system having a first securely fixable rotatable joint comprising a first planar element with a central opening; a second planar element with a central opening; a fastener passing through the central openings of the first and second planar elements; wherein each of the first and second planar elements has a plurality of openings surrounding the central opening; and the plurality of openings on one of the planar elements are arcuate slots; and further comprising fasteners passing through the plurality of openings surrounding the central opening and frictionally fixing the planar surfaces in relation to each other; and
   having a second securely fixable rotatable joint comprising third planar element with a central opening; a fourth planar element with a central opening; a fastener passing through the central openings of the third and fourth planar elements; wherein each of the third and fourth planar elements has a plurality of openings surrounding the central opening; and the plurality of openings on one of the planar elements are arcuate slots; and further comprising fasteners passing through the plurality of openings surrounding the central opening and frictionally fixing the planar surfaces in relation to each other; wherein the first and third planar elements are parallel to one another and connected to a base, and the second and fourth planar elements are connected to a mounting structure for an electronic apparatus and wherein a removeable mounting plate is secured to the mounting structure and a top plate is mounted over and secures a bottom of a gimbal bracket of the electronics apparatus to the mounting plate.

4. The vehicular electronic mounting system of claim 1 wherein each parallel planar surface has a central bolt aperture that receives a bolt and further comprising:

a first bolt securing the first upward and third downward extending surfaces; and a second bolt securing the second upward and fourth downward extending surfaces.

5. The vehicular electronic mounting system of claim 4 wherein the first upward and third downward extending surfaces each have a plurality of openings encircling the central aperture, and the openings on at least one of said surfaces being a plurality of arcuate slots, and the first and third surfaces being fixably secured together by bolts passing through the plurality of openings on the first and third planar surfaces.

6. The vehicular electronic mounting system of claim 5 wherein the plurality of openings surrounding the central aperture is at least three.

7. The vehicular electronic mounting system of claim 5 wherein the arcuate slots extend through an arc of between 60° and 100°.

8. The vehicular electronic mounting system of claim 1 wherein a second top plate is mounted over and secures a bottom of a second gimbal bracket to the mounting bar.

9. The vehicular electronic mounting system of claim 1 wherein the mounting bar has attached spaced apart downwardly extending first and second connecting arms, said first downwardly extending connecting arm having a lower end comprising the third downwardly extending planar surface and said second downwardly extending connecting arm comprising the fourth downwardly extending planar surface.

10. The vehicular electronic mounting system of claim 9 wherein the first and second connecting arms have upper ends with fifth and sixth parallel planar surfaces and spaced apart seventh and eighth parallel planar surfaces extend downward from the mounting bar; and the fifth and seventh planar surfaces are rotationally connected; and the sixth and eighth planar surfaces are rotationally connected.

11. The vehicular electronic mounting system of claim 5 wherein the first and second connecting arms have upper ends with fifth and sixth parallel planar surfaces and spaced apart seventh and eighth parallel planar surfaces extend downward from the mounting bar;

the fifth, sixth, seventh and eighth planar surfaces have central apertures;

the fifth and seventh planar surfaces are rotationally connected with a third bolt passing through the central apertures therein;

the sixth and eighth planar surfaces are rotationally connected with a fourth bolt passing through the central apertures therein; and the fifth and seventh surfaces each have a plurality of openings encircling the central aperture, and the openings on at least one of said surfaces being a plurality of arcuate slots, with the fifth and seventh surfaces being fixably secured together by bolts passing through the plurality of openings on the fifth and seventh planar surfaces.

12. The vehicular electronic mounting system of claim 2 wherein the first planar element of the first frictionally fixable joint and the third planar element of the second frictionally fixable joint are secured to the base.

13. The vehicular electronic mounting system of claim 2 wherein the second planar element is a first end of a first connecting arm having a second end connected to the mounting structure.

14. The vehicular electronic mounting system of claim 13 wherein the second end of the first connecting arm forms a first planar element of a third frictionally fixable joint.

15. The vehicular electronic mounting system of claim 2 wherein the arcuate slots each extend through an arc of between 60° and 100°.

16. The vehicular electronic mounting system of claim 12 wherein the base is a faceplate secured to a flange mounted around an opening in the vehicle structure, and the flange is secured in position by bolts passing through the vehicle structure.

17. The vehicular electronic mounting system of claim 3 wherein the first planar element of the first frictionally fixable joint and the third planar element of the second frictionally fixable joint are secured to the base.

18. The vehicular electronic mounting system of claim 3 wherein the second planar element is a first end of a first connecting arm having a second end connected to the mounting structure.

19. The vehicular electronic mounting system of claim 18 wherein the second end of the first connecting arm forms a first planar element of a third frictionally fixable joint.

20. The vehicular electronic mounting system of claim 17 wherein the base is a faceplate secured to a flange mounted around an opening in the vehicle structure, and the flange is secured in position by bolts passing through the vehicle structure.

* * * * *